United States Patent
Nakagawa et al.

(10) Patent No.: US 11,714,157 B2
(45) Date of Patent: Aug. 1, 2023

(54) SYSTEM TO DETERMINE DIRECTION TOWARD USER

(71) Applicant: AMAZON TECHNOLOGIES, INC., Seattle, WA (US)

(72) Inventors: Carlos Renato Nakagawa, San Jose, CA (US); Mohamed Mansour, Cupertino, CA (US); Borham Lee, Sunnyvale, CA (US); Shobha Devi Kuruba Buchannagari, Fremont, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 239 days.

(21) Appl. No.: 17/174,941

(22) Filed: Feb. 12, 2021

(65) Prior Publication Data
US 2022/0146617 A1    May 12, 2022

Related U.S. Application Data

(60) Provisional application No. 63/111,930, filed on Nov. 10, 2020.

(51) Int. Cl.
*G01S 3/80* (2006.01)
*G01S 3/786* (2006.01)
(Continued)

(52) U.S. Cl.
CPC .......... *G01S 3/8003* (2013.01); *G01S 3/7864* (2013.01); *H04R 1/406* (2013.01); *H04R 3/005* (2013.01)

(58) Field of Classification Search
CPC ...... G01S 3/8003; G01S 3/7864; G01S 3/802; H04R 1/406; H04R 3/005; H04R 2499/15; G06F 3/167
See application file for complete search history.

(56) References Cited

U.S. PATENT DOCUMENTS 9,665,169 B1 * 5/2017 Dai ...................... A61B 5/6898
9,678,559 B1 * 6/2017 Devries ................... G06F 3/16
(Continued)

FOREIGN PATENT DOCUMENTS

DE          69738195 T2 *  7/2008 ............... H04N 7/15
WO   WO-2022104309 A1 *  5/2022 ............ G01S 3/7864

OTHER PUBLICATIONS

"CMU-Perceptual-Computing-Lab", OpenPose, 4 pages. Retrieved from the Internet: URL: https://github.com/CMU-Perceptual-Computing-Lab/openpose.
(Continued)

*Primary Examiner* — Daniel Pihulic
(74) *Attorney, Agent, or Firm* — Lindauer Law, PLLC

(57) ABSTRACT

A device has a microphone array that acquires sound data and a camera that acquires image data. A portion of the device may be moveable by one or more actuators. Responsive to the user, the portion of the device is moved toward an estimated direction of the user. The estimated direction is based on sensor data including the sound data and the image data. First variance values for individual sound direction values are calculated. Data derived from the image data or data from other sensors may be used to modify the first variance values and determine second data comprising second variances. The second data may be processed to determine the estimated direction of the user. For example, the second data may be processed by both a forward and a backward Kalman filter, and the output combined to determine an estimated direction toward the user.

20 Claims, 12 Drawing Sheets

(51) Int. Cl.
*H04R 1/40* (2006.01)
*H04R 3/00* (2006.01)

(56) References Cited

U.S. PATENT DOCUMENTS

| 10,452,116 | B1* | 10/2019 | Devries | G01P 15/097 |
| 2018/0160032 | A1* | 6/2018 | Sawa | H04N 5/23206 |
| 2019/0278294 | A1 | 9/2019 | Shimada et al. | |
| 2022/0146617 | A1* | 5/2022 | Nakagawa | G01S 3/7864 |
| 2022/0261587 | A1* | 8/2022 | Wexler | G10L 17/04 |

OTHER PUBLICATIONS

"Face Recognition with OpenCV", 25 pages. Retrieved from the Internet: https://docs.opencv.org/3.4/da/d60/tutorial_face_main.html.

"Image Semantic Segmentation", Amazon SageMaker, Amazon Web Services 2021, 5 pages. Retrieved from the Internet: URL: https://docs.aws.amazon.com/sagemaker/latest/dg/sms-semantic-segmentation.html.

"Sound Source Localization", 7 pages. Retrieved from the Internet: URL: https://github.com/pchao6/Sound_Localization_Algorithms.

Van Den Berg, Jur, "Kalman Smoothing", 15 pages. Retrieved from the Internet: URL: http://arl.cs.utah.edu/resources/Kalman%20Smoothing.pdf.

Chakraborty, Arunava, "PyTorch for Beginners: Semantic Segmentation Using Torchvision", Jun. 5, 2019, Big Vision, 2020, 13 pages. Retrieved from the Internet: URL: https://www.learnopencv.com/pytorch-for-beginners-semantic-segmentation-using-torchvision/.

Gupta, Vikas, "Deep Learning based Human Pose Estimation using OpenCV (C++/Python)", May 29, 2018, Big Vision LLC 2020, 14 pages. Retrieved from the Internet: https://www.learnopencv.com/deep-learning-based-human-pose-estimation-using-opencv-cpp-python/.

Kochev, Miroslav, "Patent Cooperation Treaty International Search Report and Written Opinion dated Feb. 10, 2022", Patent Cooperation Treaty Application No. PCT/US21/72017, Patent Cooperation Treaty, Feb. 10, 2022.

* cited by examiner

SYSTEM TO DETERMINE DIRECTION TOWARD USER

PRIORITY

This application claims priority to, and the benefit of, U.S. Provisional Patent Application Ser. No. 63/111,930 filed on Nov. 10, 2020, titled "SYSTEM TO DETERMINE DIRECTION TOWARD USER", the contents of which are hereby incorporated by reference into the present disclosure.

BACKGROUND

A user may change locations in a physical space while using a device. Providing the device with information about which direction the user is facilitates operation of the device.

BRIEF DESCRIPTION OF FIGURES

The detailed description is set forth with reference to the accompanying figures. In the figures, the left-most digit(s) of a reference number identifies the figure in which the reference number first appears. The use of the same reference numbers in different figures indicates similar or identical items or features. The figures are not necessarily drawn to scale, and in some figures, the proportions or other aspects may be exaggerated to facilitate comprehension of particular aspects.

Figure 1:
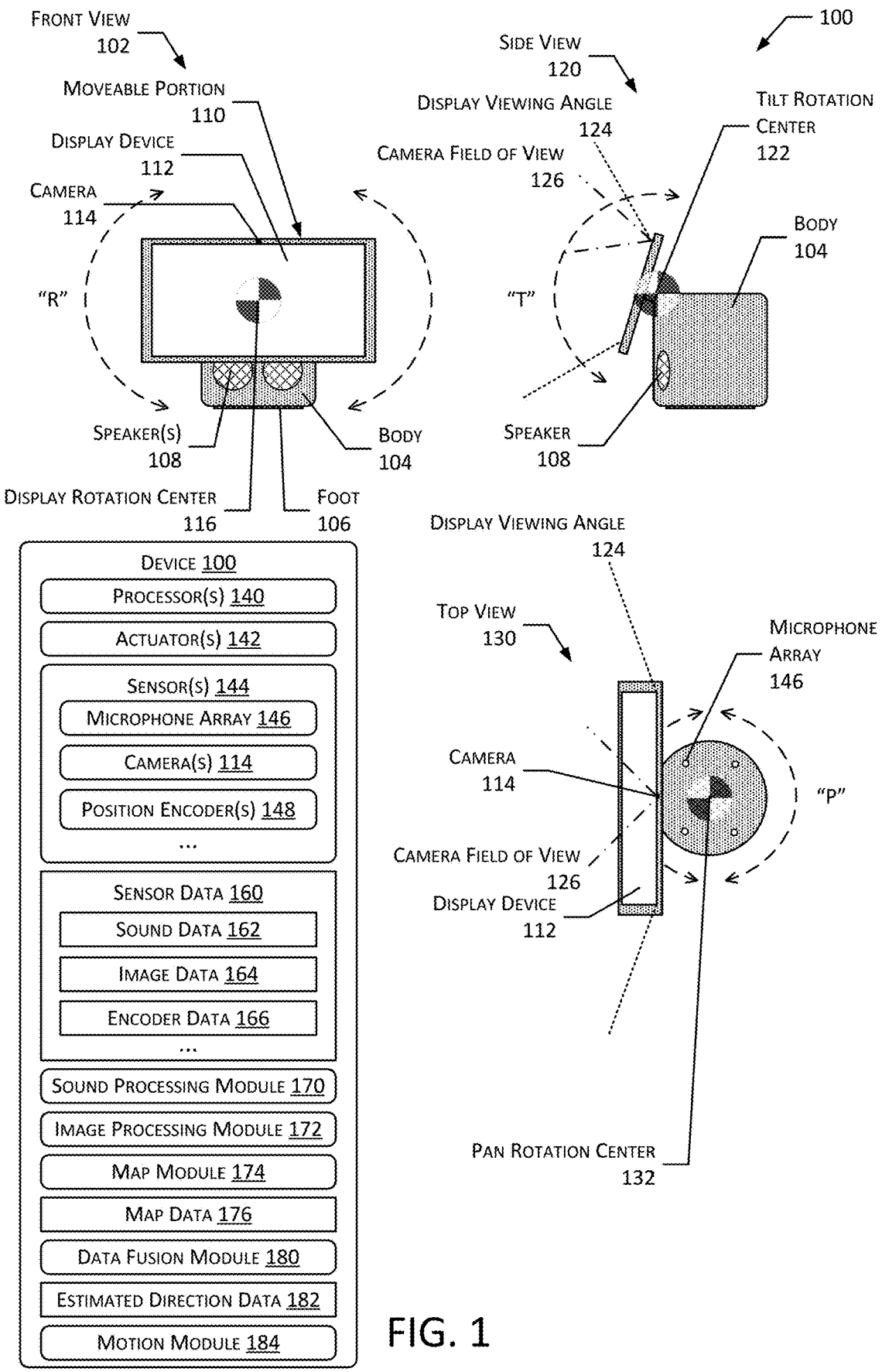
FIG. 1 illustrates a device that determines an estimated direction of a user relative to the device, according to some implementations.

While implementations are described herein by way of example, those skilled in the art will recognize that the implementations are not limited to the examples or figures described. It should be understood that the figures and detailed description thereto are not intended to limit implementations to the particular form disclosed but, on the contrary, the intention is to cover all modifications, equivalents, and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean "including, but not limited to".

DETAILED DESCRIPTION

A user, device, or both may move within a physical space. Operation of the device may be facilitated based on information about where the user is relative to the device. In one implementation, a device may have cameras, displays, or other portions that are moveable by one or more actuators. In one implementation, the device may be able to move with respect to one or more axes. For example, the device may rest on a surface such as a table or countertop. In another example, the device may comprise a robot that may move autonomously. An actuator such as a motor may be used to rotate the device with respect to a vertical axis. By rotating the device, a camera of the device and the corresponding field of view (FOV) of the camera is able to be panned left and right with respect to a physical space. During operation, this panning may allow the device to point towards a user who utters a wakeword or is otherwise speaking. For example, to initiate a video call, a user of the device may say "device, video call Alice", with the word "device" being a wakeword for the device. Responsive to this, the device determines an estimated direction towards the user. The device may use the one or more actuators to move the device, or portion thereof, based on the estimated direction.

The device that is stationary, or that does not necessarily move a moveable portion, may also benefit from information about the relative direction of the user. For example, information about the relative direction of the user may be used to present particular output on the display, to select a direction for audio beamforming, or other uses.

Described in this disclosure are techniques for determining the estimated direction of the user. One or more sensors may acquire sensor data about the device and the space around the device. For example, the sensors may include the camera, a microphone array, and so forth. Data from the sensors may be associated with a common coordinate system relative to the device and be synchronized. Sensor fusion techniques are used to determine the estimated direction based on sensor data obtained from different sensors, such as sound data from the microphone array, image data from a camera, and so forth.

Sound data from the microphone array is used to determine a set of sound direction values. These sound direction values indicate possible directions, relative to the microphone array, to an apparent source of the sound. However, several possible sound direction values may be determined for a sound. For example, sound may be reflected from various surfaces, producing more than one sound direction value. In another example, multiple sounds may be present within the same period of time, resulting in more than one sound direction value being determined. Data from other sensors is used to improve accuracy in the determination of the estimated direction by removing from consideration, or decreasing the likelihood, of particular sound direction values that are not consistent with map data.

For a device that is capable of moving, the map data may include an obstacle map. The obstacle map may be indicative of one or more directions that are associated with obstacles deemed to restrict movement of at least a portion of the device. For example, the obstacle map may be determined based on the device encountering resistance to movement of the moveable portion. A user may be assumed to not be present within the obstacle, and in any event the device should not impinge on the obstacle. As a result, a sound direction value indicative of a direction associated with an obstacle may be disregarded.

The map data may include an entity map that is indicative of one or more directions associated with one or more users (or other entities). The entity map may be indicative of current or recent presence of a user based on image data. For example, image data acquired at a time associated with the sound data may be processed using computer vision techniques to determine whether a face or body of a person appears to be depicted in the image data. If yes, a user may be deemed to be present. Based on the apparent position within the image data of the depicted user, such as a location of a bounding box around a face, an entity direction indicative of a direction of that entity relative to the device may be determined. The entity map may include a confidence value that is indicative of a likelihood that the entity detection is accurate. For example, the confidence value may be greater if the user is facing the camera and less if the user is only visible to the camera in profile.

The map data may include a segmentation map that is indicative of one or more directions associated with obstacles determined based on sensor data. In one implementation, the image data may be processed using computer vision techniques to determine semantic labels associated with portions of an image in the image data. For example, one portion of the image may be designated as "wall", another as "floor", another as "furniture", and so forth. The segmentation map provides information about open regions where a user could be, and obstacle regions where the user would not be expected to be. For example, a user may be expected to be present in an area associated with "floor" but would not be expected to be in an area associated with "wall". Based on the apparent position within the image data of the segmented portion, such as the boundaries of a "wall" in the image, a direction of that feature relative to the device may be determined. The segmentation map may include a confidence value that is indicative of a likelihood that the determination of the segment is accurate.

The map data may include a presence map or "heat map" that is indicative of one or more directions associated with locations of one or more users at previous times. For example, the presence map provides historical data about where entities, such as users, have been detected in the past. The presence map may indicate low probability regions where users have never been determined to be present. The presence map may indicate higher probability regions where users have been determined to be present. In one implementation, the presence map data may be based on previous estimated direction data. In another implementation, the presence map data may be based at least in part on image data. For example, the presence map data may be indicative of directions associated with previous users passing by the device who did not utter a wakeword.

Information based on image data may be subject to variability due to changing conditions. Changes in ambient lighting may affect the data present within the image data, or the processing of the image data. For example, a visible light camera in a totally dark room will be unable to acquire an image that reveals any information about the physical space. In another example, differences in artificial light, changing sunlight angles, and so forth may result in changing shadows. In some implementations, information about light levels such as output from an ambient light sensor, parameters associated with operation of a camera such as exposure or aperture, and so forth may be taken into consideration when using image data to determine the estimated sound direction.

In one implementation, the sensor fusion techniques may include modifying variances associated with the sound direction values. First variance values associated with the sound direction values may be determined by processing confidence values associated with the sound direction values. The first variance values are modified based on information obtained from other sensors, such as the map data, to determine second data comprising second variance values. This second data may be processed using techniques such as Kalman filters. By modifying the variances of the values, the map data or other information is able to be incorporated into the determination of the estimated direction data. For example, the first variance values associated with sound direction values indicative of directions that are consistent with a sound direction where the segmentation map shows an obstacle may be scaled up. This increases the second variance values for those sound direction values, reducing their influence on the determination of the estimated direction data. In a related example, the first variance values associated with sound direction values indicative of directions that are consistent with a sound direction where the segmentation map shows an open area may be scaled down. This decreases the second variance values for those sound direction values where a user could be, increasing their influence on the determination of the estimated direction data.

The techniques described in this disclosure provide various advantages. The variance modification to determine the second variance values is computationally compact and is readily adapted to different types of input data, such as sensor data from other sensors, manually entered data, and so forth. This improves the adaptability and flexibility of the system during operation. Modifying the variances also reduces the complexity of subsequent data processing. For example, little or no modification may be needed to process the second data with existing data processing pipelines using forward and backward Kalman filtering. The modification of variances also facilitates later changes to the data processing pipeline without requiring significant or any changes to the data processing pipeline. During operation, the techniques described herein provide highly accurate determinations of an estimated direction toward a user or other entity of interest, with very low latency. This system allows the device to quickly respond to inputs, improving the utility of the device and user experience.

Illustrative System

FIG. 1 illustrates a device 100 that may implement a system to orient the device 100 or a moveable portion thereof towards an entity, according to some implementations. The entity may comprise a user such as a person, a pet, another device, and so forth. The device 100 may be stationary, as shown here, or may be able to autonomously move in a physical space. For example, the device 100 may comprise an autonomous mobile device such as a robot.

A front view 102 of a device 100 is shown. The device 100 may include a body 104 that is supported by a foot 106. The device 100 may include one or more speakers 108. For example, the speakers 108 may be mounted within the body 104 as shown here. The device 100 may include a moveable portion 110 that can move with at least one degree of freedom with respect to the body 104. The moveable portion 110 of the device 100 may include a display device 112, one or more camera(s) 114, and so forth. In some implementations the moveable portion 110 may be able to rotate, relative to the body 104, in a direction "R" with respect to a display rotation center 116. For example, the moveable portion 110 may be able to rotate about an axis that is perpendicular to a plane of the display device 112 and centered on the display rotation center 116.

A side view 120 of the device 100 shows some additional features. In some implementations, the moveable portion 110 may tilt with respect to the body 104. For example, the moveable portion 110 may be rotatable with respect to a tilt rotation center 122 that allows the moveable portion 110 to be rotated in direction "T".

A display viewing angle 124 is shown indicating a viewable area associated with the display device 112. A camera field of view (FOV) 126 is also shown. The camera FOV 126 indicates with a dashed line the solid angle within which one of the cameras 114 obtains an image of a scene in a physical space.

A top view 130 also depicts the display device 112 and associated display viewing angle 124 and the camera(s) 114 and associated camera FOV 126. The device 100 may rotate along a vertical axis centered on a pan rotation center 132. For example, the device 100 may pan to orient the camera(s) 114 in a particular direction.

The device 100 may include a power source (not shown) to provide electrical power suitable for operating the components in the device 100. For example, power may be provided by connection to an external power source such as a building main, batteries, wireless power transfer, capacitors, fuel cells, and so forth.

In implementations in which the device 100 comprises a robot, the device 100 may have one or more wheels or other devices that allow the entire device 100 to move. For example, the robot may rotate. The robot may include one or more moveable portions 110. The robot may move one or more of the entire body or the moveable portion 110.

The device 100 may include one or more hardware processors 140 (processors) configured to execute one or more stored instructions. The processors 140 may comprise one or more cores. The processors 140 may include microcontrollers, systems on a chip, field programmable gate arrays, digital signal processors, graphic processing units, general processing units, and so forth.

The device 100 includes one or more actuators 142. The actuators 142 may comprise one or more of a motor, solenoid, piezoelectric material, electroactive polymer, shape-memory alloy, and so forth. The actuators 142 produce movement in one or more of the device 100 relative to an external environment, relative motion between parts of the device 100, and so forth. For example, an actuator 142 may be used to pan or rotate the body 104 relative to the foot 106, producing rotation about the pan rotation center 132. In another example, an actuator 142 may be used to move the moveable portion 110 relative to the body 104.

The device 100 may include one or more sensors 144. The sensors 144 may include one or more microphone array(s) 146, camera(s) 114, or position encoder(s) 148. The device 100 may include other sensors that are not depicted, such as inertial measurement unit(s) (IMU), radar, sonar, depth cameras, lidar, radio receivers, ambient light sensors, and so forth.

The microphone array 146 may comprise a plurality of microphones. The device 100 may include one or more microphone arrays 146. The microphone array 146 may be located on, integrated with, supported by, or otherwise associated with the body 104 (as shown here), the moveable portion 110, and so forth. The microphone array 146 may provide as output sound data 162. For example, the microphone array 146 may comprise a plurality of microphones.

During operation, the one or more cameras 114 acquire images of a scene and produce image data 164. The image data 164 may comprise still images, video, or other information indicative of the data acquired by the camera 114. The one or more cameras 114 may determine image data 164 using one or more of infrared light, visible light, ultraviolet light, and so forth. For example, the camera 114 may comprise a red-green-blue (RGB) camera to acquire visible light images. In some implementations the camera(s) 114 may comprise a charge coupled device (CCD), complementary metal oxide semiconductor (CMOS) device, microbolometer, and so forth. In some implementations the camera 114 may comprise a depth camera. The depth camera provides additional information indicative of a distance to an object in the camera FOV 126. For example, the depth camera may use a coded aperture, time of flight, structured light, or other techniques to determine data indicative of distance(s) to object(s) in the environment.

The device 100 or systems in communication with the device 100 may use at least a portion of the image data 164 acquired by the camera(s) 114 for object recognition, user communication, and so forth. For example, the camera(s) 114 may be used for videoconferencing or for acquiring pictures for the user. The image data 164 produced by the camera 114 may represent the scene within the camera FOV 126. The image data 164 produced by the camera 114 may have a resolution greater than that used by other applications, such as a video call application, security application, photography application, and so forth.

The position encoders 148 provide encoder data 166 indicative of a position of at least a portion of one or more of an actuator 142 or a moveable portion 110. For example, the position encoder 148 may provide encoder data 166 indicative of a relative direction the device or moveable portion 110 is pointed at a given time. The position encoder 148 may be integral with an actuator 142, or may be an external device added or used in conjunction with the actuator 142. In one implementation an integral position encoder 148 may utilize hall effect sensors, magnets, and other components within a rotary motor to determine rotation of a shaft. For example, a brushless direct current (BLDC) motor or a controller used to drive the BLDC motor may provide information as to rotational speed, rotational count, rotational direction, and so forth. In another implementation, an optical encoder using a photodiode and light to detect a code printed on an encoder wheel may be used. In another implementation, a combination of techniques may be used. For example, an optical encoder may be used to determine a reference point, such as a zero value. Subsequently, data from a motor encoder integrated into an electric motor may be used to determine a position relative to the reference point.

Output from the IMU may be used to determine movement of at least a portion of the device 100. Output from the IMU may be integrated to determine actual movement. For example, output from an IMU may indicate how far the device 100 has rotated with respect to the pan rotation center 132 from a first time to a second time. In another example, an IMU mounted on the moveable portion 110 may be used to determine the tilt of the moveable portion 110 by detecting a variation from local vertical due to gravitational acceleration.

A sound processing module 170 may accept as input the sound data 162 and determine sound direction values indicative of one or more directions of sound. For example, the sound processing module 170 may use various sound source localization (SSL) algorithms to determine first sound direction values indicative of a direction towards the source of a sound, such a user uttering a wake word. Continuing the example, the sound processing module 170 may implement SSL algorithms such as beamforming, generalized cross correlation phase transformation (GCC-PHAT), steered response power phase transform (SRP-PHAT), and so forth.

An image processing module 172 may accept as input the image data 164 and determine second estimated direction data. For example, the image processing module 172 may use computer vision (CV) algorithms to determine a location of a person based on appearance in the image data 164. In one implementation, processing of image data 164 may be performed, at least in part, using one or more tools available in the OpenCV library as developed by Intel Corporation of Santa Clara, Calif., USA; Willow Garage of Menlo Park, Calif., USA; and Itseez of Nizhny Novgorod, Russia, with information available at www.opencv.org. In another implementation, functions available in the OKAO machine vision library as promulgated by Omron Corporation of Kyoto, Japan, may be used to process the sensor data 160. In still another implementation, functions such as those in the Machine Vision Toolbox (MVTB) available using MATLAB as developed by MathWorks, Inc. of Natick, Mass., USA, may be utilized.

In some implementations, the image processing module 172 may use data indicative of a tilt angle of the camera 144 at a time when the image data 164 was acquired. The tilt angle is indicative of an angle between an optical center of the camera 114 and a reference direction, such as horizontal or vertical. For example, the tilt angle may be expressed with respect to a vertical axis due to gravity. The tilt angle may be determined based on output from the IMU, one or more position encoders 148, and so forth. At different tilt angles the image data 164 may be affected by perspective effects, the camera FOV 126 may be such that no usable information is being obtained, and so forth. For example, if the camera 114 is tilted at such an extreme angle that the camera FOV 126 only includes the ceiling or the floor, little or no usable information is available from the resulting image data 164. In some implementations, a confidence value may be determined that is based at least in part on the tilt angle. As the tilt angle departs from a specified angle, the confidence value in data produced by the image processing module 172 may decrease. For example, the tilt angle may be specified as the angle between an optical center of the camera 114 and a horizontal plane. If the tilt angle is between −10 degrees and +20 degrees, the confidence value may be a first value. If the tilt angle is between −10 and −80 degrees, the confidence value may be a second value less than the first value. If the tilt angle is between +20 and +50 degrees, the confidence value may be a third value that is less than the first value and greater than the second value.

The sensor data 160 may comprise data from the other sensors 144. For example, the sensor data 160 may comprise data from the radar, radio receiver, and so forth. The sensor data 160, or data based thereon such as produced from the sound processing module 170 or the image processing module 172, may be processed by a data fusion module 180.

Output from the sound processing module 170, the image processing module 172, or other modules may be provided to a map module 174. The map module 174 may use this information to determine map data 176 as described with regard to FIGS. 3C-3F.

Techniques such as artificial neural networks (ANNs), convolutional neural networks (CNNs), active appearance models (AAMs), active shape models (ASMs), principal component analysis (PCA), cascade classifiers, and so forth, may also be used to process the sensor data 160 or other data. For example, the ANN may be trained using a supervised learning algorithm such that object identifiers are associated with images of particular objects within training images provided to the ANN. Once trained, the ANN may be provided with the sensor data 160 and produce output indicative of the object identifier. For example, the image processing module 172 may be trained to detect a face that is depicted in an image, and this data may be used to determine map data 176.

The data fusion module 180 may perform one or more functions to process the sensor data 160 or information based thereon. The data fusion module 180 may determine variances between one or more values associated with the sensor data 160. These variances may be used by subsequent processes to determine the estimated direction towards the user. For example, the data fusion module 180 may process measurements indicative of sound direction values and their associated variances to determine modified variance values. The sound direction values and associated modified variance values may be subsequently used to determine the estimated direction data 182. This is discussed in more detail with regard to FIGS. 4, 5A-5B.

The data fusion module 180 may synchronize the sensor data 160 obtained from a plurality of the sensors 144. Different sensors 144 may generate sensor data 160 at different rates. For example, the camera(s) 114 may acquire image data 164 at 30 frames per second (FPS) while the microphone array 146 acquires audio data with a sampling rate of 48,000 times per second. Processing of different types of data may vary in timing, introducing latency into when sensor data 160 is available. The data fusion module 180 may synchronize sensor data 160, allowing sensor data 160 from different sensors 144 to be associated with a common time interval. For example, the audio data acquired by the microphone array 146 may be synchronized with the image data 164.

A motion module 184 may execute at least in part on the processor 140. The motion module 184 may receive the estimated direction data 182. The estimated direction data 182 indicates the direction of an entity relative to the device 100 or a portion thereof at a particular time. The estimated direction data 182 may be used to determine instructions to move at least the moveable portion 110. For example, the motion module 184 may receive the estimated direction data 182 and determine movement instructions that direct one or more of the actuators 142 to move at least a portion of the device 100. Continuing the example, the movement instructions may direct an actuator 142 to pan the device 100 to a relative position of +49 degrees at a first time. Responsive to these movement instructions, the motion module 184 operates the actuator 142. In one implementation, during a video call the motion module 184 attempts to point towards the user who initiated the video call. In implementations such as depicted here where the display device 112 and the camera 114 are mounted adjacent one another, such action of following also helps maintain the user within a central viewing area of the display device 112, allowing the user to more clearly see the image on the display device 112.

Figure 2:
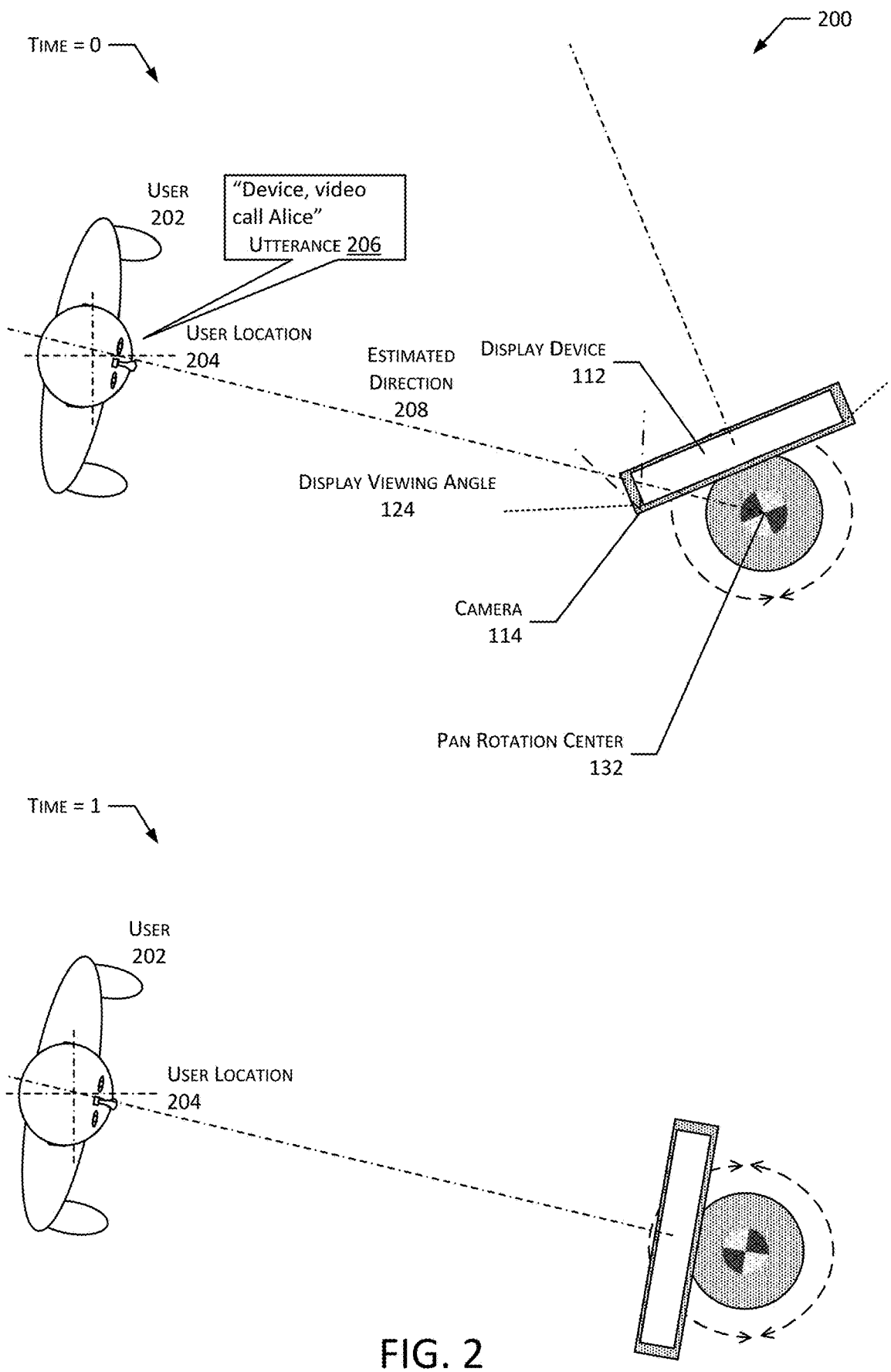
FIG. 2 illustrates the device changing orientation to the estimated direction responsive to an utterance, according to some implementations.

FIG. 2 illustrates at 200 the device 100 at a first time t=0 and a second time t=1. At a first time the device 100 is not oriented towards a user 202 at a user location 204. At time t=0 the user 202 produces an utterance 206 such as "device, video call Alice". The wakeword (WW) "device" is used to inform the device 100 that the user 202 is addressing the device 100. In other implementations other wakewords may be used. Responsive to the wakeword, the device 100 determines estimated direction data 182 indicative of the estimated direction 208 towards the user location 204.

At time t=1, the device 100 has moved to orient at least the moveable portion 110 in the estimated direction 208 indicated by the estimated direction data 182, and is now directed towards the user 202.

Figure 3A:
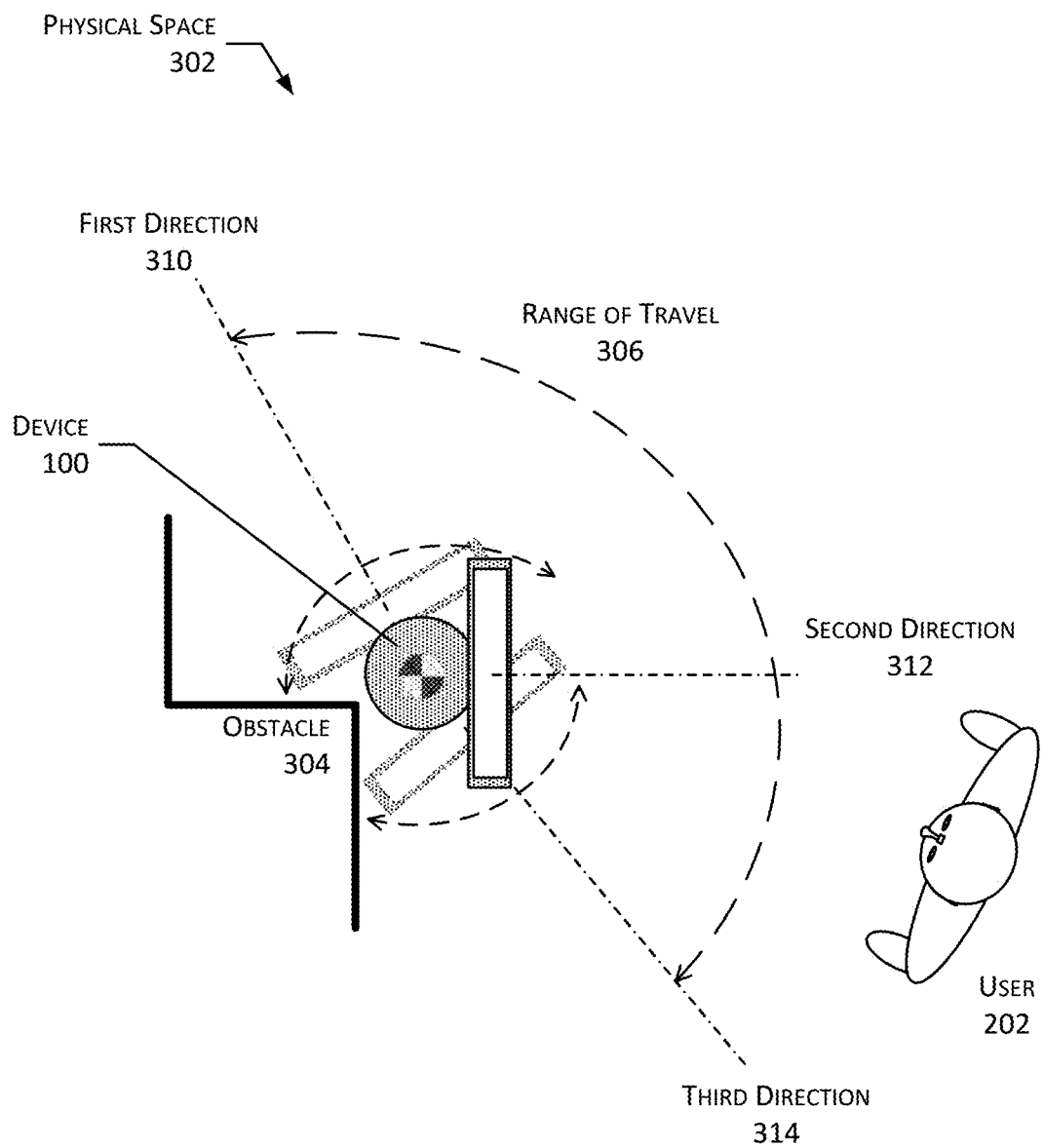
FIG. 3A depicts the device in a physical space that includes an obstacle and a user, according to some implementations.

FIG. 3A depicts the device 100 in a physical space 302 that includes an obstacle 304, according to some implementations. As shown here, the device 100 is placed near a corner of a wall. Due to the presence of the wall, the motion of the device 100 is constrained to a range of travel 306 extending from a first direction 310 at a first end of the range of travel 306, an intermediate second direction 312, and a third direction 314 at a second end of the range of travel 306. The range of travel 306 is indicative of limits to a direction change of the at least a portion of the device 100, such as the moveable portion 110. For example, the device 100 may move the moveable portion 100 within the range of travel 306, but an attempted excursion beyond this range of travel would result in the moveable portion 110 impinging on the obstacle 304.

At different times the physical space 302 may include no users 202, a single user 202 as shown here, or more than one user 202. In other implementations the device 100 may determine estimated direction data 182 for other entities, such as pets, robots, and so forth.

Figure 3B:
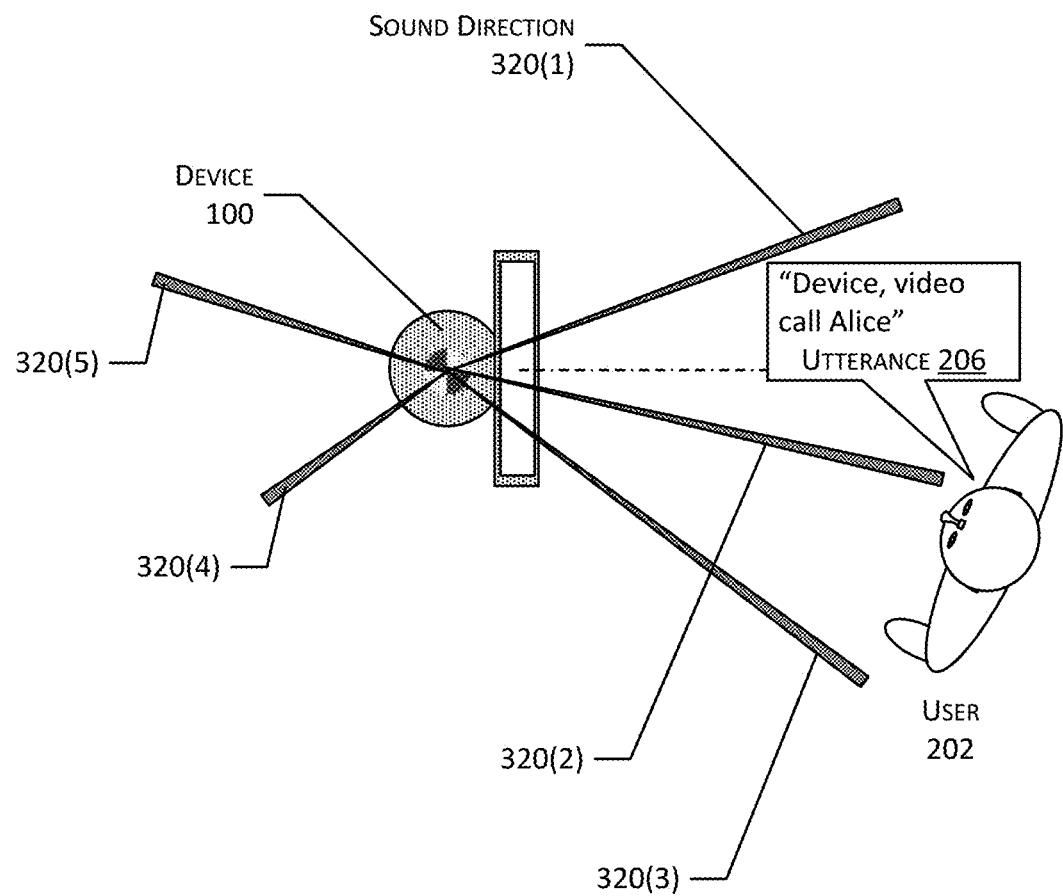
FIG. 3B depicts sound directions determined based on sound data acquired from a microphone array associated with the device, according to some implementations.

FIG. 3B depicts sound directions 320 determined based on the sound data 162 acquired from one or more microphone arrays 146 associated with the device 100, according to some implementations. For example, the microphone array 146 may be a part of the device 100, or may be external to the device 100.

The sound data 162 may be indicative of several different sound directions 320 associated with a sound such as an utterance 206. This may be due to several situations. In one situation, multiple sounds may be present in the physical space 302 at any given time. For example, while the user 202 speaks the utterance 206, other users 202 may be speaking, a television may be presenting audio data, a train may be passing by, and so forth. In another situation, each of the one or more sounds present at a given time may be determined to come from a plurality of different directions. For example, sound may be reflected from various surfaces, producing more than one sound direction value for the same sound. In another example, an SSL algorithm may produce multiple sound directions for a single sound. For example, a beamforming algorithm may determine a first sound direction 320(2) towards the user 202 and a sound direction 320(5) that is directed opposite the first sound direction 320(2). As described with regard to FIGS. 4, 5A-5B, additional data may be used to disambiguate between these sound directions and determine the estimated direction data 182 that is indicative of where the user 202 actually is with respect to the device 100.

Figure 3C:
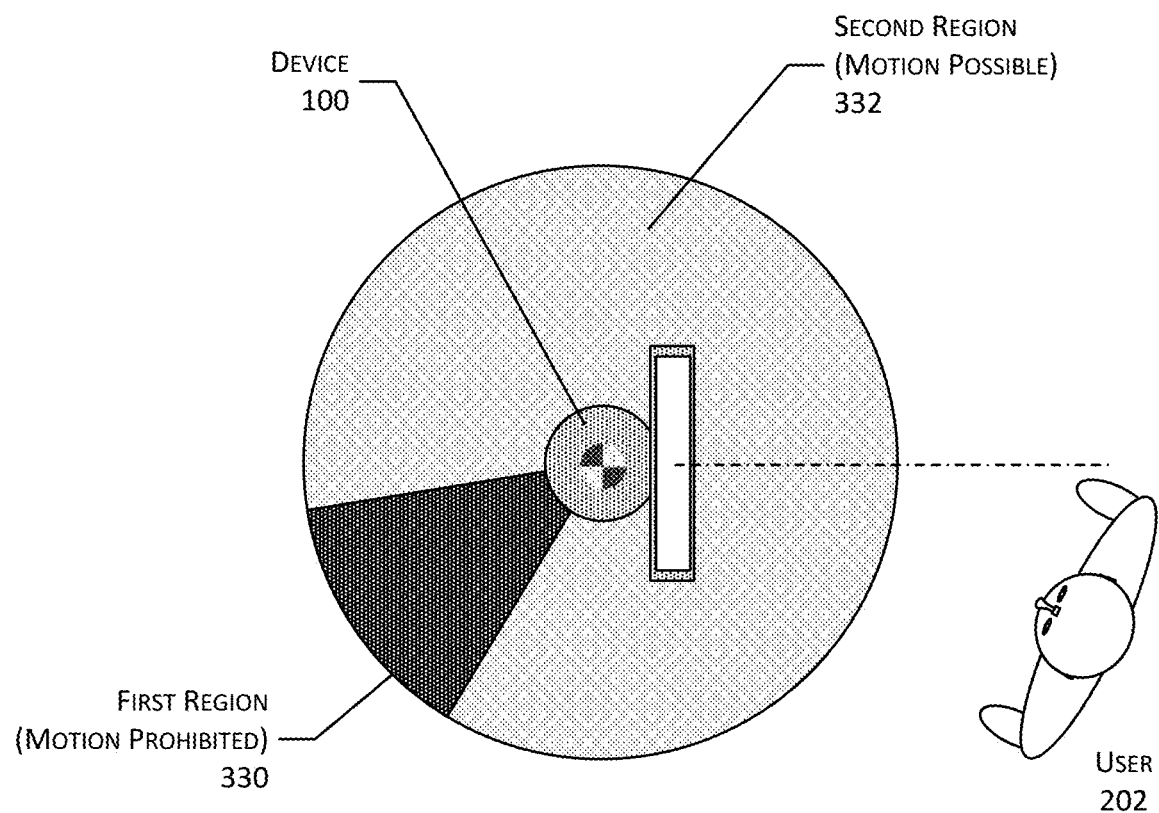
FIG. 3C depicts an obstacle map that is indicative of limits to movement of the device, according to some implementations.

FIG. 3C depicts an obstacle map, according to some implementations. The map data 176 may include the obstacle map that is indicative of limits to movement of the device 100. Considering the obstacle 304 as shown in FIG. 3A, the device 100 may move within the range of travel 306.

A first region 330 indicates where motion of the moveable part 110 is prohibited due to interference with the obstacle 304. A second region 332 indicates where motion of the moveable part 110 is possible without interference from the obstacle 304. For example, the second region 332 may be described with respect to the range of travel 306.

The obstacle map may be determined based on sensor data 160, user input, and so forth. In one implementation, the device 100 may attempt to determine if an obstacle 304 is present by operating the one or more actuators 142 to move the moveable portion 110 throughout an entire range of available motion. For example, the device 100 may attempt to rotate 360 degrees. This exploratory motion may be relatively slow, to avoid a potentially damaging collision with an unknown obstacle 304. Upon encountering the obstacle 304, if present, the motion of the moveable portion 110 may slow or stop. This may be detected based on a reduced change position as reported by the encoder data 166, by an increase in current to the one or more actuators 142, due to a force sensor on an exterior of the moveable portion 110, due to a decrease in rotation as measured by the IMU, due to a sound detected by the microphone array 146, and so forth. Based on this information, a first region 330, if present, may be determined as well as the second region 332. In another implementation the user 202 may manually specify the boundaries of the first region 330, the second region 332, or both. For example, during a configuration mode the user 202 may manually manipulate the device 100 to move the moveable portion 110 from a first direction to a second direction. Information about the first direction and the second direction may then be used to specify the second region 332.

The determination of the obstacle map may be ongoing. For example, at a later time the user 202 may place another obstacle 304 near the device 100. Once detected, the boundaries of the regions may be updated.

The obstacle map may be represented using a variety of different data structures. For example, the obstacle map may comprise a list of angles. In some implementations the obstacle map may include data indicative of distance. For example, presence of an obstacle 304 may be described as an angular range and a distance.

Figure 3D:
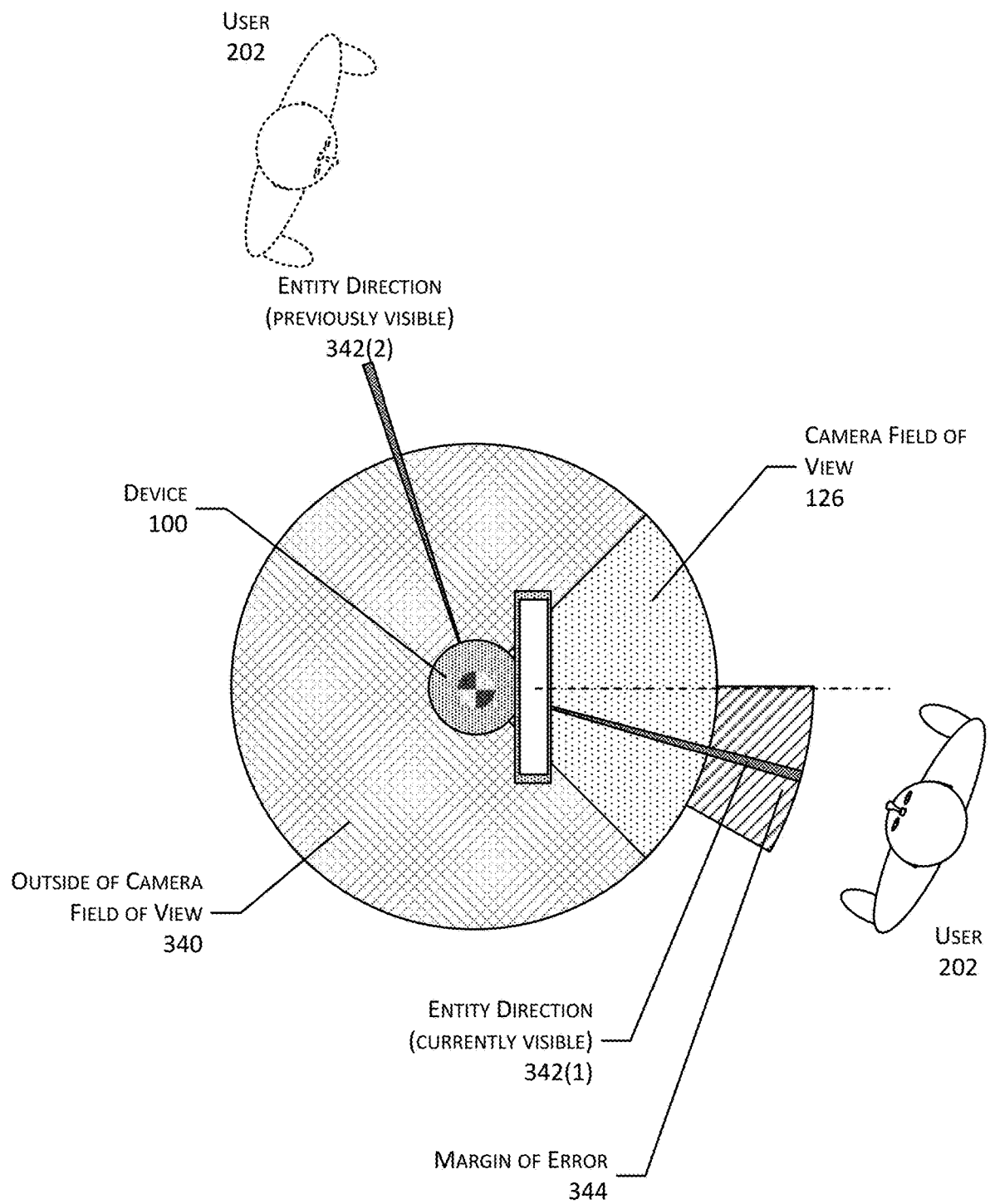
FIG. 3D depicts an entity map that is indicative of directions, with respect to the device, of persons or other entities of interest, according to some implementations.

FIG. 3D depicts an entity map, according to some implementations. The map data 176 may include the entity map that is indicative of one or more entities, such as users 202, that have been determined to be within range of one or more sensors 144 associated with the device 100. In one implementation, the entity map may be based on image data 164 acquired by the camera(s) 114.

As shown here, at any given time there is a portion of the physical space 302 that is within the camera field of view 126 and another portion that is outside of the camera field of view 340. During operation, the device 100 may change orientation from one direction to another, resulting in the orientation of the camera field of view 126 and the outside of camera field of view 340 regions changing. The entity map comprises data indicative of the presence of entities that have been deemed present within some interval of time. For example, the interval of time may be image data 164 acquired in the last 500 milliseconds.

The image data 164 may be processed by the image processing module 172 to determine whether an entity of interest, such as a user 202, is depicted within the image data 164. The encoder data 166, IMU data, or other sensor data 160 may be used to determine the direction the camera(s) 114 is pointed at the time a particular image is acquired. Given known parameters of the camera 114 and the apparent location of the entity within the image, an entity direction 342 may be determined. For example, if the device 100 is pointed in the direction of 90 degrees at the time a first image is acquired, and a face is determined to be depicted in a center of that first image, an entity direction of 90 degrees is determined.

The process of detecting and determining the entity direction 342 may exhibit a margin of error 344. This margin of error 344 is representative of where the user 202 may actually be in the physical space 302, relative to the determined entity direction 342.

The entity direction 342 may also be associated with a confidence value. The confidence value is indicative of a likelihood that the determination of the entity direction 342 is correct, relative to the actual user 202 in the physical space 302. For example, the image processing module 172 may utilize a neural network to determine whether a user 202 is depicted. This determination may be subject to some uncertainty, that is characterized by the confidence value.

As mentioned, the device 100 may move, "sweeping" the camera field of view 126 through the physical space 302. The entity map may include entity directions 342 and associated data for entities present during a specified interval of time, or set of acquired image data 164.

The determination of the entity map may be ongoing during operation. The entity map may be associated with data that indicates if the entity map information is out of date or "stale". For example, a flag may be set if the entity map data is more than 1000 milliseconds old.

The entity map may be represented using a variety of different data structures. For example, the entity map may comprise a list of angles. In some implementations the entity map may include data indicative of distance. For example, a distance to the user 202 may be estimated based on apparent size in the image, based on data from a depth camera, using stereovision techniques, and so forth. Continuing the example, the entity map be indicative of the entity direction 342 described as an angular range, an angular range of the margin of error 344, a distance, and the confidence value.

Figure 3E:
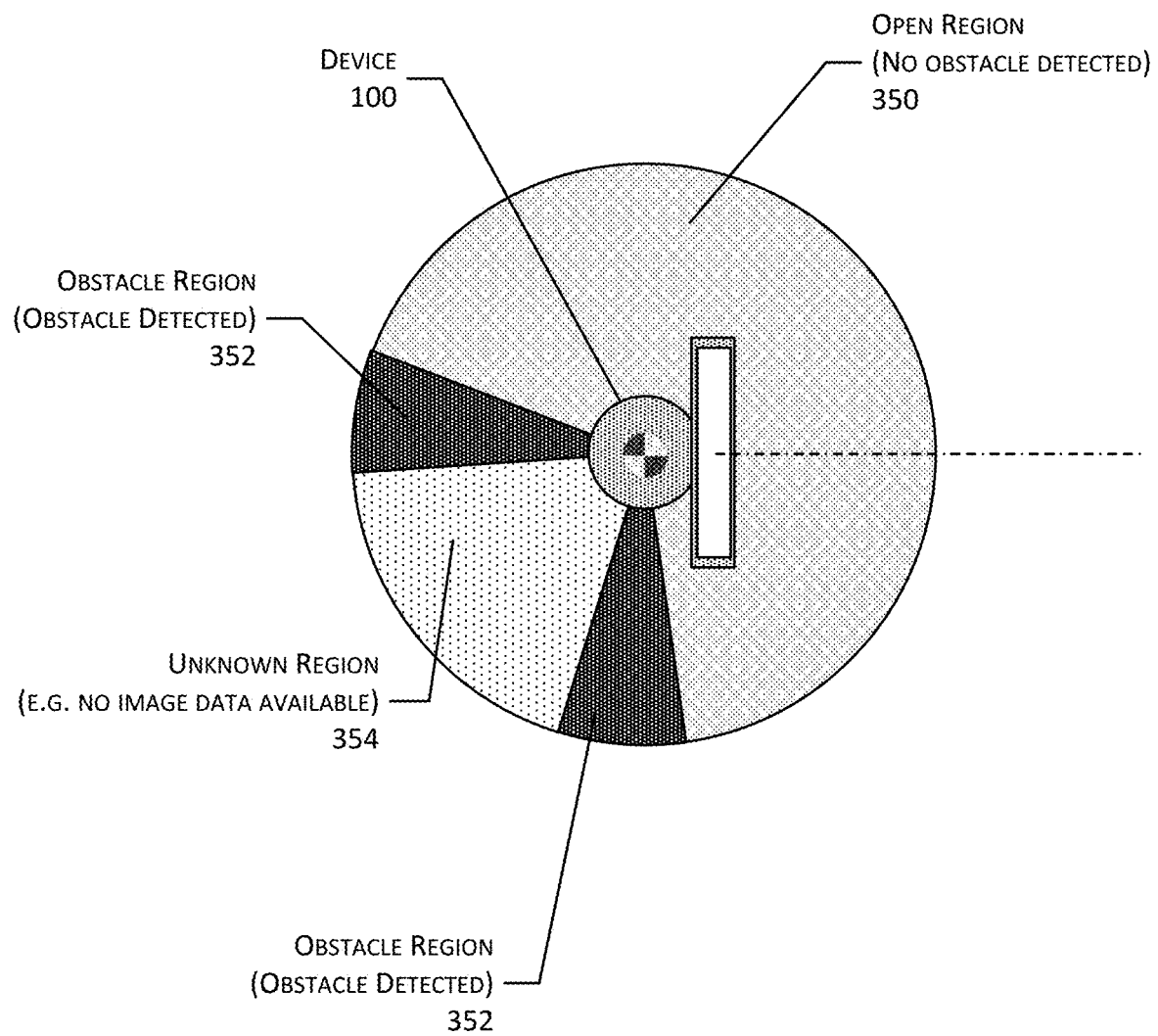
FIG. 3E depicts a segmentation map that indicates obstacles detected based on sensor data such as image data, according to some implementations.

FIG. 3E depicts a segmentation map, according to some implementations. The map data 176 may include the segmentation map that is indicative of obstacles 304 detected based on sensor data 160 from the one or more sensors 144 associated with the device 100. For example, the segmentation map may comprise information indicative of walls, floor, furniture, and so forth. In one implementation, the segmentation map may be based on image data 164 acquired by the camera(s) 114, depth data obtained from a lidar, radar data obtained from a radar, ultrasonic data obtained using an ultrasonic transducer, and so forth.

The encoder data 166, IMU data, or other sensor data 160 may be used to determine the direction the camera(s) 114 or other sensor 144 is pointed at the time a particular image is acquired. Given known parameters of the camera 114 and the apparent location of the entity within the image, an entity direction 342 may be determined. For example, if the device 100 is pointed in the direction of 90 degrees at the time a first image is acquired, and a face is determined to be depicted in a center of that first image, an entity direction of 90 degrees is determined.

The image data 164 may be processed by the image processing module 172 to determine the segmentation map. For example, the image processing module 172 may determine semantic labels associated with portions of an image in the image data 164. These semantic labels may be used to categorize whether a portion of the physical space 302 that is depicted in the image is an open region 350 or an obstacle region 352. Open regions 350 may comprise a portion of the physical space 302 within which a user 202 could be present. In comparison, an obstacle region 352 may comprise a portion in the physical space 302 within which presence of a user 202 would not be likely. For example, a user 202 may be expected to be present in an area associated with "floor" but would not be expected to be in an area associated with "wall". Based on the apparent position within the image data 164 of the segmented portion, such as the boundaries of a "wall" in the image, a direction of that feature relative to the device 100 may be determined. The segmentation map may include a confidence value that is indicative of a likelihood that the determination of the segment is accurately bounded, accurately labeled, and so forth. For example, the image processing module 172 may utilize a neural network to determine the segmentation map. This determination may be subject to some uncertainty, that is characterized by the confidence value.

An unknown region 354 may be present, indicative of a portion of the physical space 302 for which sensor data 160 is unavailable to use to determine the segmentation map. In the situation illustrated with regard to FIG. 3A and FIG. 3E, the device 100 is blocked by the obstacle 304 from moving in a complete 360 degree circle. As a result, the device 100 is unable to acquire image data 164 of part of the physical space 302 that is outside of the camera field of view 126 at the first direction 310 or the third direction 314.

The determination of the segmentation map may be ongoing during operation. The segmentation map may be associated with data that indicates if the segmentation map information is out of date or "stale". For example, a flag may be set if the entity map data is more than three days old.

The segmentation map may be represented using a variety of different data structures. For example, the segmentation map may comprise a list of angles. In some implementations the segmentation map may include data indicative of distance. For example, a distance to a wall may be estimated based on apparent size in the image, based on data from a depth camera, using stereovision techniques, and so forth. Continuing the example, the segmentation map be indicative of an angular range, a distance, and the confidence value.

Figure 3F:
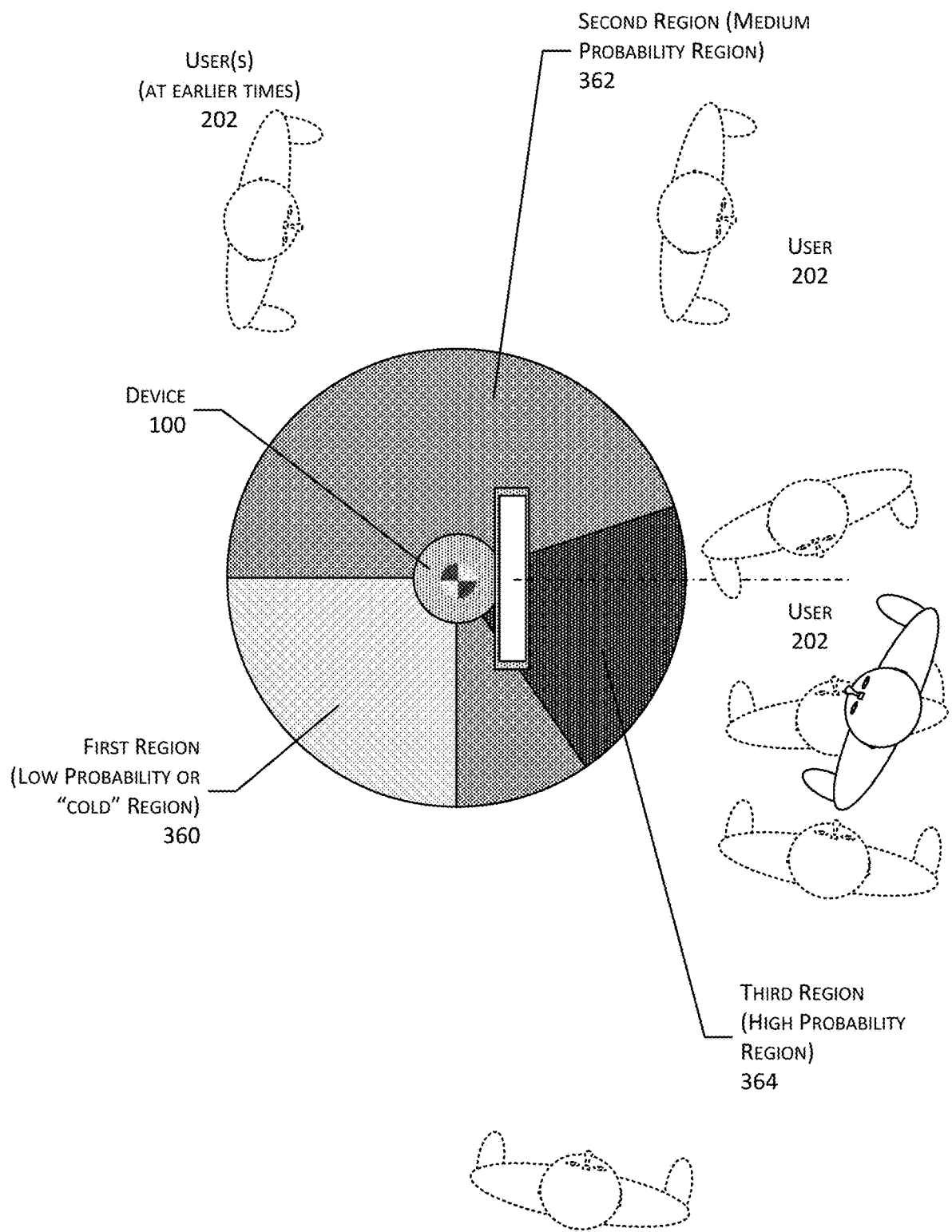
FIG. 3F depicts a presence map that indicates previously detected locations of persons or other entities of interest, according to some implementations.

FIG. 3F depicts a presence map, according to some implementations. The map data 176 may include the presence map that is indicative of one or more entities, such as users 202, that have been determined to be within range of one or more sensors 144 associated with the device 100 over some interval of time. In one implementation, the presence map may be based on image data 164 acquired by the camera(s) 114, previously acquired estimated direction data 182, data from other devices such a robot, and so forth. Other sensors 144 may also be used to determine presence map data. For example, a radio receiver may receive a signal transmitted by a fob, smartphone, or other device that is associated with users 202.

At various times, users 202 or other entities of interest move in the physical space 302. Data indicative of the presence of the entity is maintained and used to determine the presence or "heat" map that is indicative of where entities have been previously. In this illustration we see depicted with broken lines users 202 that have been deemed present by the device 100 over some period of time, such as the last four days. The presence map may represent this information as one or more regions. Each region may be described by one or more angles, an angular width, distance, and so forth. In this illustration, a first region 360 is indicative of a low probability of containing an entity (a "cold" region). No entities have been detected within the first region 360 within the period of time. A second region 362 is depicted that is indicative of a medium probability of containing an entity (a "warm" region). A third region 364 is depicted that is indicative of a high probability of containing an entity (a "hot" region). While the presence map is described in terms of probability, other measurements may be used. For example, a count of entity detections within a given angular range (or "bin") may be used.

The data in the presence map may be associated with a confidence value. For example, detection of the entity and the determination of its direction vary based on the techniques used. The confidence value is indicative of a likelihood that the determination of the presence of the entity and the direction is correct, relative to the presence of actual entities in the physical space 302. For example, estimated direction data 182 may be associated with a greater confidence value than presence that is determined based on image data 164 alone, or from reception of a radio signal.

The determination of the presence map may be ongoing during operation. For example, the presence map may be based on data acquired during the last four days. The presence map may be represented using a variety of different data structures. For example, the presence map may comprise a list of angles. In some implementations the presence map may include data indicative of distance. For example, a distance to the user 202 may be estimated based on apparent size in the image, based on data from a depth camera, using stereovision techniques, and so forth. Continuing the example, the presence map be indicative of the entity direction 342 described as an angular range, a distance, and the confidence value.

Figure 4:
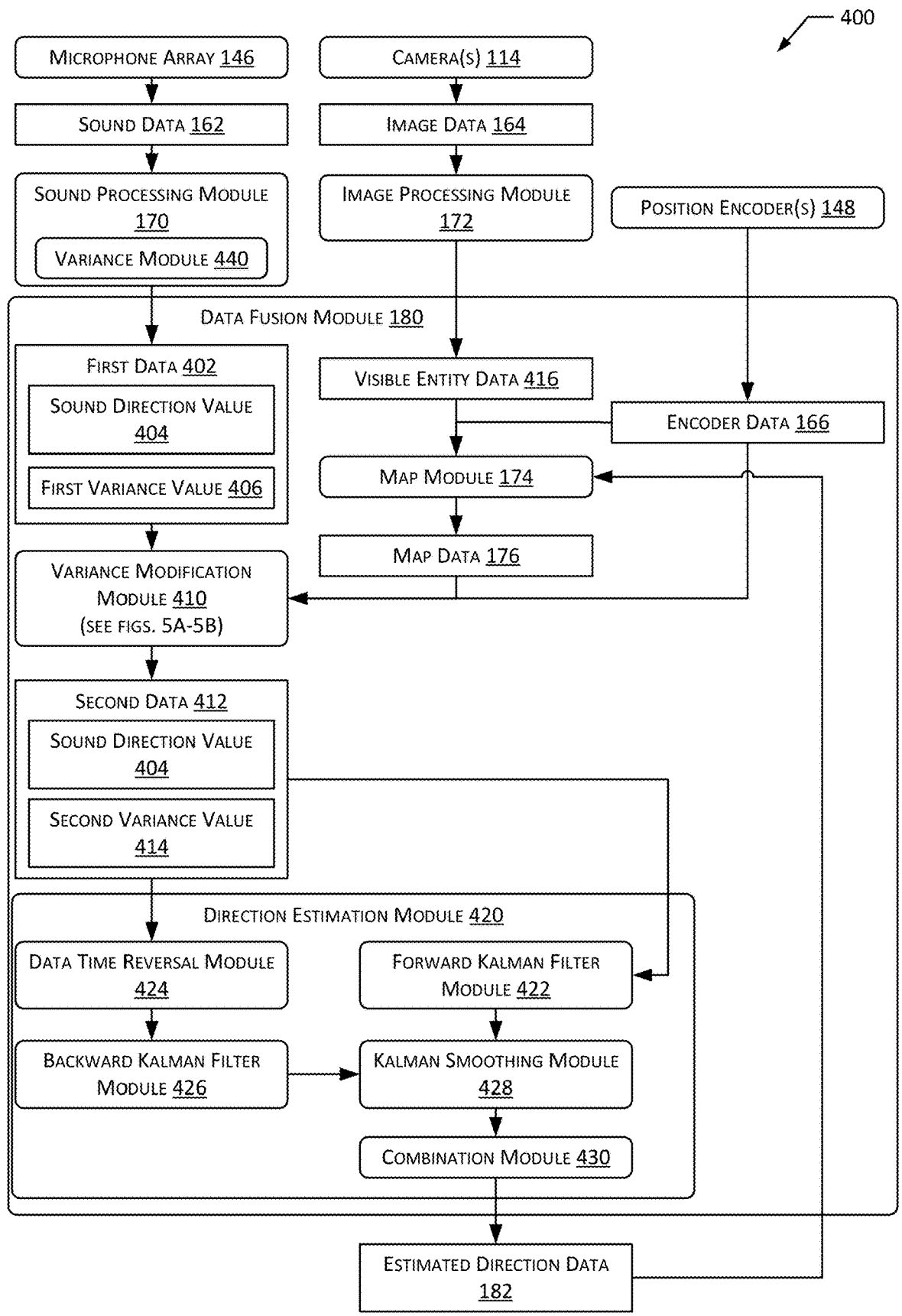
FIG. 4 is a flow diagram of a process for data fusion using sound data and other sensor data such as image data, according to some implementations.

FIG. 4 is a flow diagram 400 of a process for data fusion using sound data 162 and other sensor data 160 such as image data 164, according to some implementations. The process may be implemented at least in part by the device 100.

A microphone array 146 provides sound data 162 to a sound processing module 170. The sound processing module 170 may provide various functions, such as wakeword detection, sound source localization (SSL), and so forth. During operation, the sound processing module 170 may determine first data 402. The first data 402 may comprise a plurality of sound direction values 404 and information associated with each of those sound direction values 404. Each sound direction value 404 may be indicative of an estimated direction of a sound. The estimated direction may be described with respect to the microphone array 146, the body 104, other portion of the device 100, or an external coordinate system. The additional information associated with each sound direction value 404 may comprise a variance value from a mean, a confidence value, or other value. In some implementations, each sound direction value 404 is associated with a confidence value that is indicative of a conditional probability that the sound direction value 404 is correct. To facilitate processing by the data fusion module 180, a variance module 440 may process the confidence value or other value to determine a first variance value 406. The first data 402 may be provided to a variance modification module 410, described below.

In some implementations, the determination of the first data 402 may be determined responsive to detection of a wakeword. For example, the sound processing module 170 may process the sound data 162 and determine utterance of a wakeword. Responsive to this, the sound processing module 170 may determine the first data 402.

In one implementation, the variance module 440 may implement a multimodal function that uses the confidence value as an input and determines a variance relative to a Gaussian distribution. The variance module 440 may thus provide mapping between a confidence value or other output from the sound processing module 170 and a variance value that may be used for subsequent processing. In one implementation, the mapping may be implemented using the following equations.

In some implementations, the determination of the sound direction values 404 may generate confidence measures that are proportional to:

$$P(\theta|y(f,t))$$

where P(.|) is the conditional probability), frequency f, and time t.
(Equation 1)

In implementations where the sound processing module 170 utilizes an acoustic wave decomposition (AWD) algorithm that includes computation of a least-square solution to a linear system of equations at each time-frequency cell:

$$y(f, t) = (\psi(f, \theta 1, \phi 1)\psi(f, \theta 2, \phi 2) \ldots \psi(f, \theta N, \phi N)) \begin{pmatrix} \alpha 1 \\ \vdots \\ \alpha N \end{pmatrix}$$

where N is a number of entries in a device acoustic dictionary.
(Equation 2)

The device acoustic dictionary ("dictionary") comprises a precomputed set of acoustic pressure vectors from a plurality of directions. The dictionary may be computed using acoustic simulation techniques.

The quantities in Equation 2 are complex-valued. The size of the observation vector is the size of the microphone array 146. For example, the microphone array 146 may utilize 4 microphones with N>1000 to provide a suitable representation of three-dimensional space around the device 100. The equation 2 is highly underdetermined, and proper regularization is needed to solve it. This regularization may be done in two steps: 1) Identify the K strongest components using cross-correlation and 2) compute a regularized least square solution using a pruned dictionary with only the entries of the K strongest entries.

The cross-correlation $\rho_l$ between the observation and the 1-th entry in the device dictionary is:

$$\rho l(f,t) \triangleq \psi x^H(f,\theta_l,\phi_l) \cdot y(f,t)$$

(Equation 3)

The strongest K components are retained for further analysis (typically K≤20). The microphone array 146 may experience limited directivity. To account for limited directivity of the microphone array 124, entries that have neighbors with stronger-cross correlation are discarded. For example, the neighborhood range may be set to 30°. After identifying a small set of components for further investigation, the weights of each component may be computed by solving the regularized least square problem using equation 4.

$$J = \|y(f,t) - A\alpha\|^2 + \lambda \|\alpha\|^2$$

where A is a 4×K matrix whose columns correspond to the pruned dictionary, and a is a vector with the corresponding weights.

(Equation 4)

A coordinate-descent procedure may be used to optimize the solution to Equation 4. In some implementations a maximum of 20 iterations may be sufficient to determine a usable result. The dominant computation in each iteration is the matrix-vector multiplication Aa. After running the above procedure at each frequency, the partial weights are averaged across frequency for each sound direction value 404 θ to produce a final weight at each sound direction value 404 θ.

The full decomposition procedure involves solving the optimization problem of Equation 4 at each frequency, which significantly increases the computational requirement. Rather than computing the full weights, the cross-correlation with each component as in Equation 3 may be used as a proxy for component weights. This may be considered to resemble a matched filter detector which is considered to be an optimal detector for a signal in additive white Gaussian noise. It is an approximation because multiple components exist in the observed signal and the entries in the device dictionary are not orthogonal. When combined with averaging over frequency and elevation angles, this provides an effective approximation that is computationally simpler. A likelihood function $\Omega(\theta, t)$ is computed by averaging matched filter score for the sound direction value 404 θ as:

$$\Omega(\theta, t) = \int_{fmin}^{fmax} W(f, t) \sum_{\theta 1=\theta} |\rho_l(f, t)|$$

where W(f,t) is a frequency weighting function that reflects the relative contribution of each frequency, and the inner sum averages the matched filter score of the sound direction value 404 θ across all elevations (with equal probability to all elevations).
(Equation 5)

If full decomposition is used, then $\rho_i$ in Equation 5 is replaced by $\alpha_l$ after solving Equation 4. In one implementation, this may result in equation 6:

$$W(f, t) = \frac{\Gamma(\gamma(f, t))}{\|y(f, t)\|^2}$$

where γ(f,t) is the signal to noise ratio (SNR), and F is a sigmoid function.
(Equation 6)

It is worthwhile to note that γ(f,t) is computed from raw microphone measurements from the microphone array 146 and the same value may be used for scaling both Multichannel Linear Prediction Coding (MCLPC) coding and raw microphone components. The SNR weighting may serve to adjust the confidence of each frequency measurement according to its SNR, while the amplitude weighting provides frequency normalization across the frequency range of interest [[f$_{min}$, f$_{max}$].

The likelihood function $\Omega Q(\theta, t)$ in Equation 5 is an approximation of sound source localization probability $P(\theta|\{y(f,t)\}_f)$. If only a single time frame is observed, then the sound direction value 404 θ that maximizes $\Omega(\theta, t)$ is the maximum-likelihood estimation. During operation of the device 100, multiple time frames span the duration of the utterance 206, and the estimates within the duration of the utterance 206 may be averaged using a Kalman smoother. The likelihood function provides measurement to the Kalman smoother at each time frame, where each measurement comprises a sound direction value 404 θ and a corresponding first variance value 406 as described herein.

The likelihood function $\Omega(\theta, t)$ is a multimodal function that approximates a Gaussian mixture, as shown in Equation 7:

$$\Omega(\theta, t) = \sum_l \delta_l N(\mu 1, \sigma_l^2)$$

(Equation 7)

The measurements to the Kalman smoother at time t are the local maxima $\Omega(\theta, t)$, which correspond to the Gaussian means $\{\mu_l\}$. To refine the measurements, only local maxima within a threshold E are retained, and a bound is set on the number of measurements per frame to accommodate constraints during operation. The corresponding variance $v_l$ is computed to reflect both its relative weight and variance as shown in Equation 8:

$$v_l = \frac{\delta_{1-\epsilon}}{\sum_k \delta_k - \epsilon} \cdot \hat{\sigma}_l^2$$

where $\hat{\sigma}_l^2$ is the estimated variance of the l-th Gaussian component in Equation 7; which is the square of the standard deviation at which $\Omega(\theta, t)$ in Equation 7 drops to $0.67\delta_l$.
(Equation 8)

In other implementations the first variance value 406 may be calculated using other techniques. For example, the plurality of first variance values 406 may be indicative of a variation between respective ones of the sound direction values 404 and a specified value. For example, the first variance value 406 may be calculated as a difference between a sound direction value 404 and a mean or average of the plurality of sound direction values 404. In another example, the first variance value 406 may be a difference between the sound direction value 404 and a sound direction value 404 having a greatest detected signal amplitude.

In some implementations the sound processing module 170 may initiate subsequent actions, such as a determination of the first data 402 responsive to detection of a wakeword in the sound data 162. For example, the device 100 or a portion thereof may operate in a low power mode until a wakeword is detected. After detecting the wakeword, the device 100 or portions thereof may transition to an operational power mode and begin determination of the first data 402 or other operations.

One or more cameras 114 acquire image data 164. The image data 164 may be processed by one or more image processing modules 172. In one implementation, the image processing module 172 may comprise an entity detection module. For example, the entity detection module may use a trained neural network to detect an entity of interest or portion thereof that is depicted in the image data 164. Continuing the example, the entity detection module may use a face detection module, body detection module, and so forth. The image processing module 172 may provide as output visible entity data 416. The visible entity data 416 may comprise data indicative of an entity direction 342. For example, the image processing module 172 may determine a bounding box that delineates a portion of an image in the image data 164 that is deemed likely to have a face depicted therein. Based on the location of the bounding box within the image, and given information about the orientation of the camera 114 at the time the image data 164 was acquired, the visible entity data 416 may be determined that is indicative of the entity direction 342.

Output from the image processing module 172 may comprise a confidence value. The confidence value may be indicative of a likelihood that the output is representative of the actual situation in the physical space 302. In some implementations the confidence value may be based at least in part on a tilt angle of the camera 114 or other sensor 144. For example, the confidence value of an entity detection may be related to the tilt angle. For example, as the tilt angle departs from a specified range, the confidence value in the determination that an entity was detected may decrease.

Output from the image processing module 172 may be provided to the map module 174. The map module 174 may use this information to determine the map data 176 as described with regard to FIGS. 3C-3F. For example, the visible entity data 416 may be used to determine the entity map, the presence map, and so forth.

The position encoders 148 provide encoder data 166 to one or more of the map module 174, the variance modification module 410, and so forth. The encoder data 166 may be used to determine an orientation of the device 100 or the moveable portion 110 at the time sensor data 160 was acquired, to determine an obstacle that impairs movement of the moveable portion 110, and so forth. This information may then be used to determine the obstacle map.

In other implementations, sensor data 160 from other sensors may be processed and provided as input to the map module 174. For example, sensor data 160 from lidar, radar, ultrasonic sensors, and so forth may be used to determine the obstacle map, entity map, segmentation map, presence map, and so forth.

The variance modification module 410 may accept as input the first data 402 and one or more of the map data 176, the encoder data 166, or other data. The variance modification module 410 processes the first data 402 to determine second data 412. The second data 412 may comprise the sound direction values 404 and associated second variance values 414 that are based on the first variance values 406. For example, the variance modification module 410 may modify or change the first variance values 406 responsive to information such as the map data 176. One implementation of the variance modification module 410 is described below with regard to FIGS. 5A-5B. Modifying the variance values allows the additional information, such as map data 176, to contribute to the determination of the estimated direction data 182. For example, a sound direction value 404 having a sound direction 320 pointing towards where the entity map indicates a user 202 is located would have the variance value decreased. In another example, the sound direction value 404 that has a sound direction 320 pointing away from where the entity map indicates the user 202 is located would have the variance value increased. This scaling of the variance values allows subsequent data processing to proceed without substantial modification, and with low latency, while still allowing the overall data fusion module 180 to take into consideration data from sources in addition to the microphone array 146.

In other implementations, other techniques may be used. For example, instead of modifying the first variance values 406 to determine second variance values 414, a weighting factor may be calculated. This weighting factor may then be used to increase or decrease the relative importance of individual sound direction values 404 during subsequent processing. For example, sound direction values 404 may be ranked by their associated weighting factors, with the highest ranked weighting factor being selected as the estimated direction data 182.

Other sensors 144 (not shown) may provide other sensor data 160 that is processed and provided to or used by the data fusion module 180.

The second data 412 comprising a set of a plurality of sound direction values 404 and their associated second variance values 414 is provided to one or more direction estimation modules 420. In the implementation shown here, the direction estimation module 420 implements Kalman filtering to determine the estimated direction data 182. In other implementations, other algorithms may be used to determine the estimated direction data 182 from the second data 412.

The direction estimation module 420 may include a data time reversal module 424 that determines a time-reversed set of the second data 412. This time-reversed set of second data 412 is processed by a backward Kalman filter module 426 that implements a Kalman filter. The second data 412 (in the original time order) is processed by a forward Kalman filter module 422. The output from the backward Kalman filter module 426 and the forward Kalman filter module 422 are provided to a Kalman smoothing module 428 that provides smoothed output data. The smoothed output data may then be combined by a combination module 430 to determine the estimated direction data 182.

In some implementations the estimated direction data 182 may be provided to the data fusion module 180. For example, the estimated direction data 182 may be used by the map module 174 to determine the presence map.

Figure 5A:
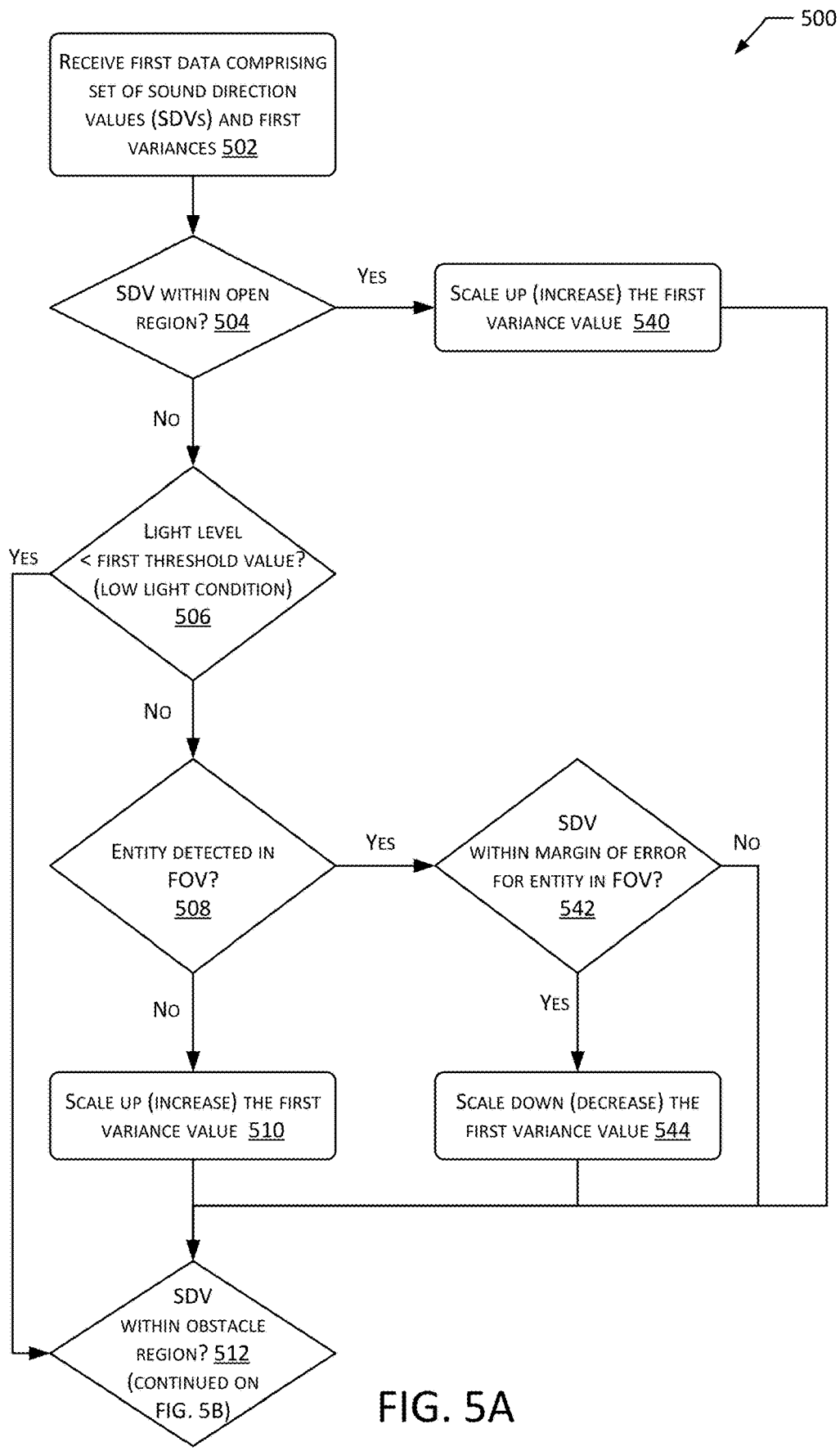
FIGS. 5A-5B are a flow diagram of a process for scaling variance values associated with sound direction values based on other sensor data, according to some implementations.
Figure 5B:
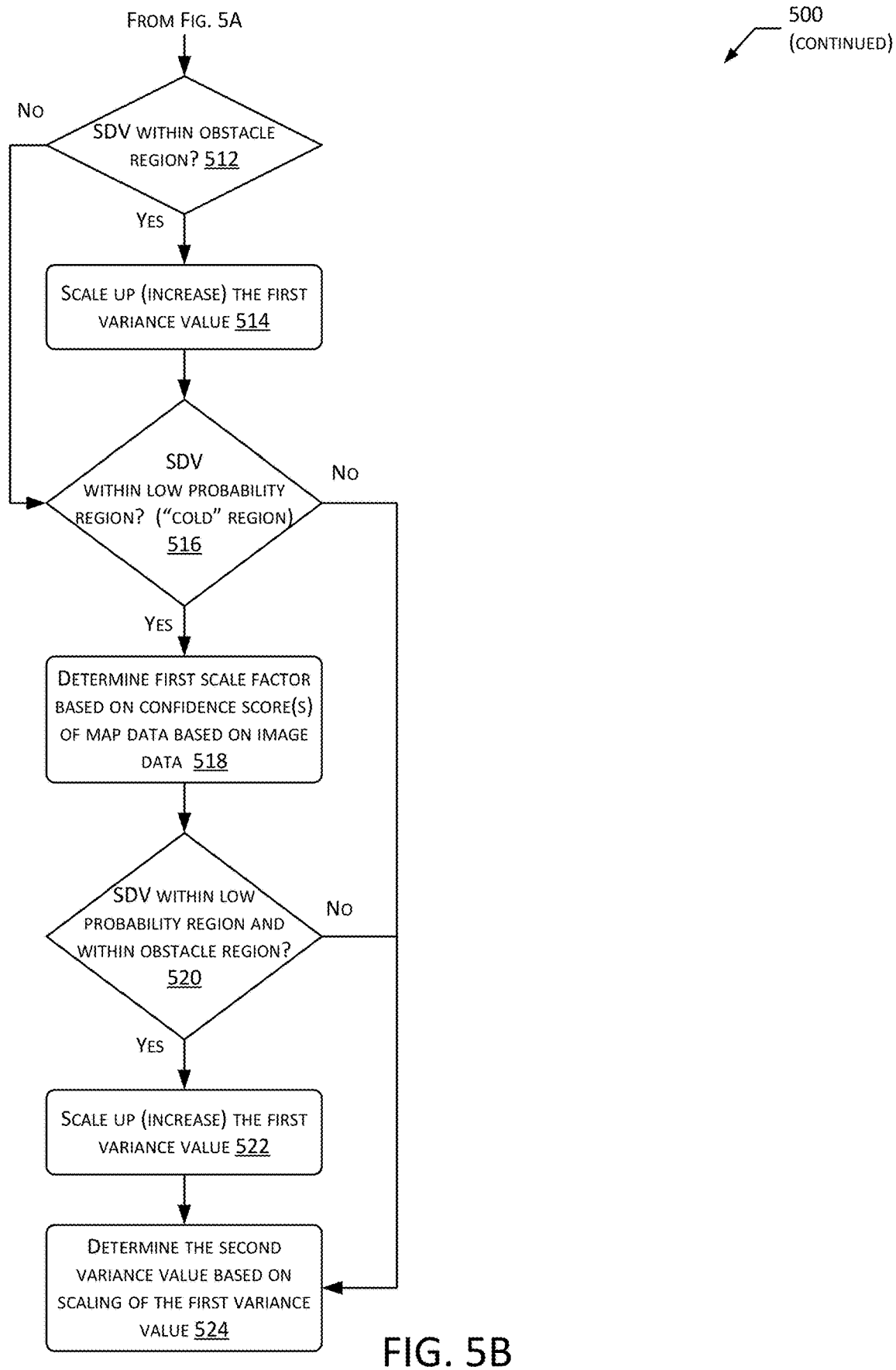

FIGS. 5A-5B are a flow diagram 500 of a process for scaling first variance values 406 associated with sound direction values 404, based on other sensor data 160 to determine second data 412, according to some implementations. The process may be implemented at least in part by the device 100. For example, the process may be implemented by the variance modification module 410. The process may iterate through the first data 402, processing a given pair of sound direction value 404(1) and associated first variance value 406(1), and then processing the next sound direction value 404(N) and associated first variance value 406(N).

At 502 the first data 402 is received. The first data 402 comprises a plurality of sound direction values (SDVs) 404 and associated first variance values 406.

At 504 a determination is made as to whether the SDV 404 is within an open region 350 as specified by the obstacle map. This provides a check to determine if the sound direction 320 indicated by the SDV 404 is within a second region 332 where motion of at least the moveable portion 110 is possible. If yes, the process proceeds to 540. At 540, the first variance value 406 is scaled up (increased). The modification of the first variance value 406 may include modifying a temporary value of the first variance value 406 that is being operated on during an iteration of the process described herein, updating a scaling factor that is associated with the first variance value 406 during an iteration and then applied to determine the second variance value 414, or other operations. If no, the process proceeds to 506.

At 506 a determination is made as to whether the light level is less than a first threshold value. If yes, (e.g. light level is deemed insufficient for operation) the process proceeds to 512. If no, (e.g. light level is deemed sufficient for operation) the process proceeds to 508. For example, in low light conditions the image data 164 obtained by the camera(s) 114 may be less reliable. Continuing the example, if the room is completely dark and no illumination is provided by the device 100, the image data 164 will contain no usable information. As described earlier, the light level may be determined based on output from an ambient light sensor, based on processing of the image data 164, based on one or more parameters associated with operation of the camera(s) 114, and so forth.

At 508 a determination is made as to whether the entity map is indicative of an entity being within the camera field of view 126. In some implementations a comparison may be made to determine if a confidence value in the detection of the entity is greater than a second threshold value. In some implementations, the confidence value may be based at least in part on a tilt angle of the camera 114 at the time the image data 164 was acquired. If the determination at 508 is yes, the process proceeds to 542. If no, the process proceeds to 510.

At 510, the first variance value 406 is scaled up (increased) and the process proceeds to 512. The increase in variance is representative of the situation in which the particular SDV 404 is inconsistent with the entity direction 342 indicated by the image data 164. As described with regard to FIG. 3D, operations such as the detection of a user 202 being depicted in image data 164 may have some level of uncertainty, that is indicated by the confidence value. A low confidence value may indicate that the information of the entity direction 342 in the entity map should be given no or minimal consideration. Likewise, a high confidence value may indicate the entity direction 342 in the entity map should be given greater consideration.

At 542 a determination is made as to whether the SDV 404 is within a margin of error 344 for the entity direction 342 indicated by the entity map. As described above, there may be some margin of error 344 as to the actual location of the user 202 as detected in the image data 164. This determination allows for this imprecision to be accounted for. If yes, the process proceeds to 544. At 544, the first variance value 406 is scaled down (decreased). The decrease in the variance is representative of the assurance that the particular SDV 404 being processed is at least consistent with the entity direction 342 indicated by the image data 164. If no, the process proceeds to 512 in FIG. 5B.

In one implementation, a confidence value associated with the detection of the entity may be used to determine a scale factor for the first variance value 406. For example, a predetermined function, a lookup table, and so forth may be used to determine the scale factor. Continuing the example, as the confidence score of the entity detection varies, so too may the scaling applied to the first variance value 406 change. In one implementation the scale factor may be determined using a lookup table that associates particular confidence scores or ranges of confidence scores with particular scale factors. In another implementation, a predetermined function may be used to calculate the scaling to be applied to the first variance value 406. The scale factor may then be used to modify the first variance value 406. This implementation may be used in place of, or in addition to, operations 508, 510, 542, and 544. For example, a situation in which no entity is detected may have a confidence value of 0, and be associated with the modification of the variance value as discussed with regard to 510. Continuing the example, in situations where the confidence value of an entity being detected is greater than zero, based on the confidence value, a scale factor may be determined.

At 512 a determination is made as to whether the SDV 404 is within a region indicated by the segmentation map as being associated with an obstacle 304. For example, the user 202 would not be expected to be within an obstacle 304 such as a wall, or a wall may be more likely to produce sound echoes that could produce an erroneous SDV 404. If the SDV 404 is within an obstacle region 352, the process proceeds to 514. At 514, the first variance value 406 is scaled up (increased) and the process proceeds to 516. The increase in variance is representative of the situation in which the particular SDV 404 is inconsistent with the segmentation map. If no, the process proceeds to 516.

At 516 a determination is made as to whether the SDV 404 is within a low probability region as indicated by the presence map. For example, the user 202 would not be expected to be within the first region 360, as no users 202 have been previously indicated as being there by the presence map. If yes, the process proceeds to 518. If no, the process proceeds to 524.

At 518, a first scale factor is determined based on a confidence score(s) of the map data 176 and the process proceeds to 520. For example, as the confidence score of the presence map varies, so too may the scaling applied to the first variance value 406 change. In one implementation the first scale factor may be determined using a lookup table that associates particular confidence scores or ranges of confidence scores with particular scale factors. The first scale factor may then be used to modify the first variance value 406.

At 520 a determination is made as to whether the SDV 404 is within a low probability region of the presence map and a region indicated by the segmentation map that is associated with an obstacle. If yes, the process proceeds to 522. If no, the process proceeds to 524.

At 522 the first variance value 406 is scaled up (increased) and the process proceeds to 524. The increase in variance is representative of the situation in which the particular SDV 404 is directed towards an area where a user 202 is unlikely to be and where an obstacle 304 has been deemed present.

At 524 the second variance value 414 is determined based on the scaling of the first variance value 404. For example, the second variance value 414 may be greater than, equal to, or less than the associated first variance value 406.

In other implementations one or more operations described above may be omitted, combined, performed in another order, and so forth. For example, the light level determination at 506 may be omitted. Similarly, logically equivalent comparisons may be used.

In some implementations, instead of or in addition to scaling, one or more monotonic functions may be used to determine how to modify the first variance value 406. For example, based on the conditions encountered, a monotonically increasing function may be used to determine a scale factor that modifies the first variance value 406 such that when applied, the resulting modified value is either not increased or is increased by a value greater than 0, but is not reduced in value.

Figure 6:
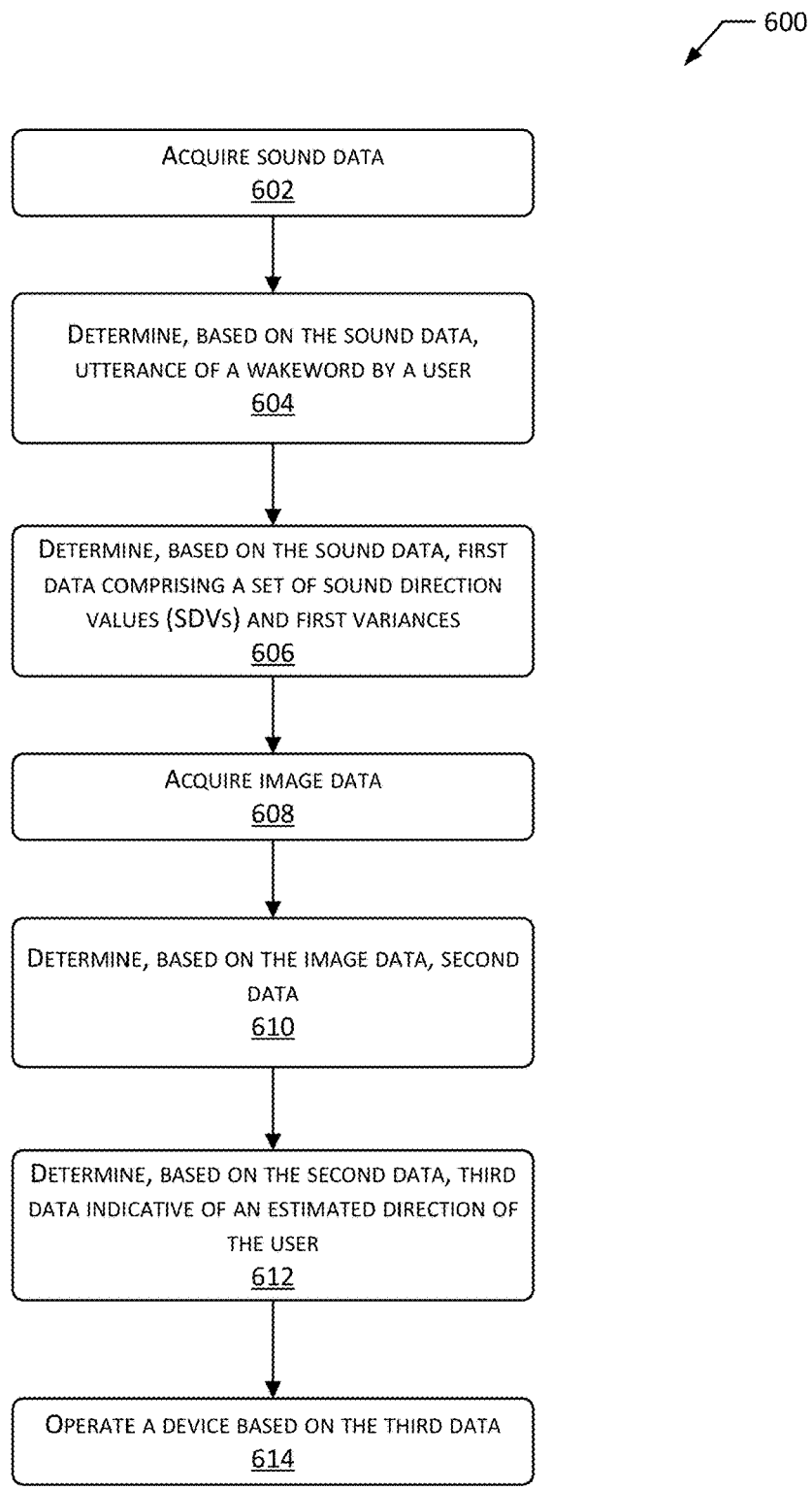
FIG. 6 is a flow diagram of a process for determining the estimated direction, according to some implementations.

FIG. 6 is a flow diagram 600 of a process for determining estimated direction data 182, according to some implementations. The process may be implemented at least in part by the device 100, a server, and so forth.

At 602 sound data 162 is acquired by the microphone array 146. The microphone array 146 may be part of the device 100 or an external device.

At 604, based on the sound data 162, utterance 206 of a wakeword is detected.

For example, the device 100 may determine the utterances 206 of the wake word.

At 606, based on the sound data 162, first data is determined that comprises a set of sound direction values 404 indicative of sound directions 320 and first variance values.

At 608 image data 164 is acquired using the camera 114. The camera(s) 114 may be part of the device 100 or an external device.

At 610, based on the image data 164, second data is determined. For example, the second data may comprise the sound direction values 404 and second variances that have been scaled by the variance modification module 410.

At 612, based on the first data and the second data, third data that is indicative of an estimated direction of the user 202. For example, the third data may comprise the estimated direction data 182. For example, the direction estimation module 420 may process the second data 412 to determine the estimated direction data 182.

At 614, the device 100 is operated based on the third data. In one implementation, the actuator(s) 142 are operated to move the at least a portion of the device 100. For example, the device 100 may direct the display device 112, a camera 114, or other components towards the user 202 as indicated by the estimated direction data 182. In another implementation, the third data may be used to operate a user interface, for further signal processing, and so forth. For example, the third data may be used to change presentation on a display screen, such as changing the apparent position of eyes of an animated image presented on the display device 112, providing the user 202 with an indication that the device 100 has detected the user 202. In another example, the third data may be used to select a direction to perform beamforming for one or more of the microphone array 146 to receive audio from the user 202, to perform beamforming on output from a plurality of speakers 108 to direct sound towards the user 202, and so forth.

The processes and methods discussed in this disclosure may be implemented in hardware, software, or a combination thereof. In the context of software, the described operations represent computer-executable instructions stored on one or more computer-readable storage media that, when executed by one or more hardware processors, perform the recited operations. Generally, computer-executable instructions include routines, programs, objects, components, data structures, and the like that perform particular functions or implement particular abstract data types. Those having ordinary skill in the art will readily recognize that certain steps or operations illustrated in the figures above may be eliminated, combined, or performed in an alternate order. Any steps or operations may be performed serially or in parallel. Furthermore, the order in which the operations are described is not intended to be construed as a limitation.

Embodiments may be provided as a software program or computer program product including a non-transitory computer-readable storage medium having stored thereon instructions (in compressed or uncompressed form) that may be used to program a computer (or other electronic device) to perform processes or methods described herein. The computer-readable storage medium may be one or more of an electronic storage medium, a magnetic storage medium, an optical storage medium, a quantum storage medium, and so forth. For example, the computer-readable storage medium may include, but is not limited to, hard drives, floppy diskettes, optical disks, read-only memories (ROMs), random access memories (RAMS), erasable programmable ROMs (EPROMs), electrically erasable programmable ROMs (EEPROMs), flash memory, magnetic or optical cards, solid-state memory devices, or other types of physical media suitable for storing electronic instructions. Further embodiments may also be provided as a computer program product including a transitory machine-readable signal (in compressed or uncompressed form). Examples of transitory machine-readable signals, whether modulated using a carrier or unmodulated, include, but are not limited to, signals that a computer system or machine hosting or running a computer program can be configured to access, including signals transferred by one or more networks. For example, the transitory machine-readable signal may comprise transmission of software by the Internet.

Separate instances of these programs can be executed on or distributed across any number of separate computer systems. Thus, although certain steps have been described as being performed by certain devices, software programs, processes, or entities, this need not be the case, and a variety of alternative implementations will be understood by those having ordinary skill in the art.

Additionally, those having ordinary skill in the art will readily recognize that the techniques described above can be utilized in a variety of devices, physical spaces, and situations. Although the subject matter has been described in language specific to structural features or methodological acts, it is to be understood that the subject matter defined in the appended claims is not necessarily limited to the specific features or acts described. Rather, the specific features and acts are disclosed as illustrative forms of implementing the claims.

What is claimed is:

1. A device comprising:
   a camera;
   a microphone array;
   one or more memories storing first computer-executable instructions; and
   one or more processors to execute the first computer-executable instructions to:
      acquire sound data using the microphone array;
      determine, based on the sound data, utterance of a wakeword;
      determine, based on the sound data, first data comprising:
         a plurality of sound direction values, wherein each sound direction value is an estimated direction of the utterance with respect to the device, and
         a plurality of first variance values, wherein each first variance value is associated with each of the sound direction values;
      acquire image data using the camera;
      determine second data based at least in part on the image data;
      determine third data comprising:
         the plurality of sound direction values, and
         a plurality of second variance values that are based on the plurality of first variance values as modified based on the second data;
      determine direction data based on the third data; and
      operate the device based on the direction data.

2. The device of claim 1, the third data further comprising one or more of:
   fourth data indicative of one or more directions associated with obstacles deemed to restrict movement of at least a portion of the device,
   fifth data indicative of one or more directions associated with one or more persons determined to be depicted in the image data,
   sixth data indicative of one or more directions associated with one or more obstacles determined to be depicted in the image data, or
   seventh data indicative of one or more directions associated with locations of one or more persons.

3. A device comprising:
a camera;
a microphone array;
one or more memories storing first computer-executable instructions; and
one or more processors to execute the first computer-executable instructions to:
acquire, using the microphone array, sound data representative of a sound;
determine, based on the sound data, first data indicative of a first set of sound direction values;
acquire image data using the camera;
determine, based at least in part on the image data, second data;
determine, based on the first data and the second data, third data indicative of a direction of the sound; and
operate the device based on the third data.

4. The device of claim 3, wherein the first data comprises:
a plurality of sound direction values, and
a plurality of first variance values, wherein each first variance value of the plurality of the first variance values:
(i) is associated with a corresponding sound direction value from the plurality of sound direction values, and
(ii) is based on a confidence value associated with the corresponding sound direction value; and
wherein the second data comprises a plurality of second variance values that are determined based on the plurality of first variance values and the image data.

5. The device of claim 3, the one or more processors to further execute the first computer-executable instructions to:
determine fourth data indicative of one or more limits to a change in direction of a portion of the device;
determine the first set of sound direction values that are indicative of a direction that is within the one or more limits indicated by the fourth data; and
wherein the determination of the third data is based on the first set of sound direction values.

6. The device of claim 3, further comprising:
a sensor to determine fourth data indicative of an ambient light level; and
wherein the third data is further based at least in part on the fourth data.

7. The device of claim 3, the one or more processors to further execute the first computer-executable instructions to:
determine one or more parameters associated with operation of the camera during acquisition of the image data; and
wherein the third data is based at least in part on the one or more parameters associated with operation of the camera.

8. The device of claim 3, the one or more processors to further execute the first computer-executable instructions to:
determine that the image data depicts a person;
determine fourth data that is indicative of a direction of the person;
determine fifth data indicative of a likelihood that the fourth data is correct; and
determine the second data based at least in part on the fifth data.

9. The device of claim 3, the one or more processors to further execute the first computer-executable instructions to:
determine, based on the image data, fourth data indicative of:
a first direction that is associated with an obstacle, and
a second direction that is associated with no obstacle;
wherein the second data is further based at least in part on the fourth data.

10. The device of claim 3, the one or more processors to further execute the first computer-executable instructions to:
determine, between a first time and a second time, fourth data indicative of a direction with respect to the device that is associated with a person;
wherein the sound data and the image data are acquired at a third time that is after the second time; and
wherein the second data is further based at least in part on the fourth data.

11. The device of claim 3, the one or more processors to further execute the first computer-executable instructions to:
determine a tilt angle with respect to vertical of the camera corresponding to the image data; and
determine, based on the tilt angle, a confidence value indicative of accuracy of the second data;
wherein the third data is based at least in part on the confidence value.

12. The device of claim 3, the first computer-executable instructions to operate the device based on the third data further comprise instructions to one or more of:
operate an actuator to move a portion of the device,
operate a display device, or
process second sound data acquired by the microphone array based on the third data.

13. A method comprising:
acquiring, using a device comprising a plurality of microphones, sound data representative of a sound;
determining, based on the sound data, first data comprising:
a first plurality of sound direction values, and
a plurality of first variance values, wherein each first variance value of the plurality of the first variance values is associated with a corresponding sound direction value from the first plurality of sound direction values;
acquiring, using a camera associated with the device, image data;
determining, based at least in part on the image data, second data; and
determining, based on the first data and the second data, third data indicative of a direction of the sound with respect to the device.

14. The method of claim 13, further comprising:
operating an actuator to move at least a portion of the device, based on the third data.

15. The method of claim 13, wherein:
the each first variance value of the plurality of the first variance values is based on a confidence value associated with the corresponding sound direction value; and
the second data comprises a plurality of second variance values that are determined based on the plurality of first variance values and the image data.

16. The method of claim 13, further comprising:
determining fourth data indicative of one or more limits to a direction change of at least a portion of the device, wherein the one or more limits are less than a full range of motion available to at least a portion of the device;
wherein the determining the third data is based on one or more of the sound direction values in the first plurality of sound direction values being indicative of a direction that is within the one or more limits indicated by the fourth data.

17. The method of claim 13, further comprising:
determining fourth data indicative of an ambient light level; and wherein the determining the third data is further based at least in part on the fourth data.

18. The method of claim 13, further comprising:
determining that the image data depicts a person;
determining fourth data that is indicative of a direction of the person;
determining fifth data indicative of a likelihood that the fourth data is correct; and
wherein the determining the second data is further based at least in part on one or more of the fourth data or the fifth data.

19. The method of claim 13, further comprising:
determining, based on the image data, fourth data indicative of:
   a first direction associated with an obstacle, and
   a second direction that is associated with no obstacle; and
wherein the second data is further based at least in part on the fourth data.

20. The method of claim 13, further comprising:
determining, between a first time and a second time, fourth data indicative of a direction with respect to the device that is associated with a person;
wherein the sound data and the image data are acquired at a third time that is after the second time; and
wherein the second data is further based at least in part on the fourth data.

\* \* \* \* \*